United States Patent
Hayasaka et al.

(10) Patent No.: US 8,743,431 B2
(45) Date of Patent: Jun. 3, 2014

(54) SHEET CONVEYING DEVICE, IMAGE READING DEVICE, AND IMAGE FORMING DEVICE

(71) Applicants: Kenji Hayasaka, Miyagi (JP); Hiroshi Kubo, Kanagawa (JP); Shinya Kitaoka, Kanagawa (JP); Takehisa Shimazu, Tokyo (JP); Takeshi Akai, Kanagawa (JP); Takuma Ariga, Kanagawa (JP); Fumiyuki Heishi, Miyagi (JP); Yoshito Suzuki, Kanagawa (JP); Akihito Kameda, Saitama (JP); Hiroaki Utagawa, Miyagi (JP); Jun Yamada, Kanagawa (JP); Takashi Fujii, Kanagawa (JP); Motoya Sano, Osaka (JP); Satoshi Saito, Kanagawa (JP); Ikuhisa Okamoto, Kanagawa (JP); Kenichiro Morita, Tokyo (JP)

(72) Inventors: Kenji Hayasaka, Miyagi (JP); Hiroshi Kubo, Kanagawa (JP); Shinya Kitaoka, Kanagawa (JP); Takehisa Shimazu, Tokyo (JP); Takeshi Akai, Kanagawa (JP); Takuma Ariga, Kanagawa (JP); Fumiyuki Heishi, Miyagi (JP); Yoshito Suzuki, Kanagawa (JP); Akihito Kameda, Saitama (JP); Hiroaki Utagawa, Miyagi (JP); Jun Yamada, Kanagawa (JP); Takashi Fujii, Kanagawa (JP); Motoya Sano, Osaka (JP); Satoshi Saito, Kanagawa (JP); Ikuhisa Okamoto, Kanagawa (JP); Kenichiro Morita, Tokyo (JP)

(73) Assignee: Ricoh Company, Limited, Tokyo (JP)

( * ) Notice: Subject to any disclaimer, the term of this patent is extended or adjusted under 35 U.S.C. 154(b) by 0 days.

(21) Appl. No.: 13/768,270

(22) Filed: Feb. 15, 2013

(65) Prior Publication Data

US 2013/0215481 A1    Aug. 22, 2013

(30) Foreign Application Priority Data

Feb. 16, 2012  (JP) .................................. 2012-032061

(51) Int. Cl.
*H04N 1/04* (2006.01)
(52) U.S. Cl.
USPC ........... 358/498; 358/468; 358/496; 399/361; 399/367; 271/114; 271/225
(58) Field of Classification Search
CPC ........ B65H 3/0615; B65H 39/10; B65H 7/20; B65H 5/02; B65H 5/06; B65H 7/01; G06F 1/32
USPC ................. 358/498, 474, 496, 497, 468, 488; 399/361, 367, 307, 309, 302; 271/114, 271/34, 10.01, 207, 279, 225, 263, 265.04, 271/3.01, 8.01, 278
See application file for complete search history.

(56) References Cited

U.S. PATENT DOCUMENTS 5,177,547 A * 1/1993 Kanemitsu et al. ........... 399/397
(Continued)

FOREIGN PATENT DOCUMENTS

JP    2000-174978    6/2000

*Primary Examiner* — Negussie Worku
(74) *Attorney, Agent, or Firm* — Harness, Dickey & Pierce, P.L.C.

(57) ABSTRACT

A sheet conveying device includes: a sheet housing unit that houses a sheet; a sheet conveying unit that conveys the sheet; a sheet detection unit that detects presence or absence of the sheet in the sheet housing unit; a sheet nipping unit that nips the sheet housed in the sheet housing unit; and a control unit. The control unit controls the sheet nipping unit to reach a nipping state to nip the sheet in the sheet housing unit upon the sheet detection unit detecting a sheet-present state, executes a power saving mode to stop supplying power to at least a part of the electric mechanisms when no drive command is input for a predetermined time, and controls the sheet nipping unit to cancel the nipping state before execution of the power saving mode.

7 Claims, 11 Drawing Sheets

(56) References Cited

U.S. PATENT DOCUMENTS

| | | | |
|---|---|---|---|
| 6,442,368 B1* | 8/2002 | Ohtsuka et al. | 399/382 |
| 6,983,117 B2* | 1/2006 | Sohmiya et al. | 399/307 |
| 7,756,434 B2* | 7/2010 | Murata | 399/70 |
| 7,782,504 B2* | 8/2010 | Okubo et al. | 358/498 |
| 8,040,578 B2* | 10/2011 | Sonetaka et al. | 358/498 |
| 8,205,869 B2* | 6/2012 | Hosaka et al. | 271/3.14 |
| 8,585,051 B2* | 11/2013 | Arakane | 271/258.01 |
| 2010/0078877 A1* | 4/2010 | Yamamoto et al. | 271/207 |
| 2012/0030419 A1* | 2/2012 | Chino | 711/106 |

* cited by examiner

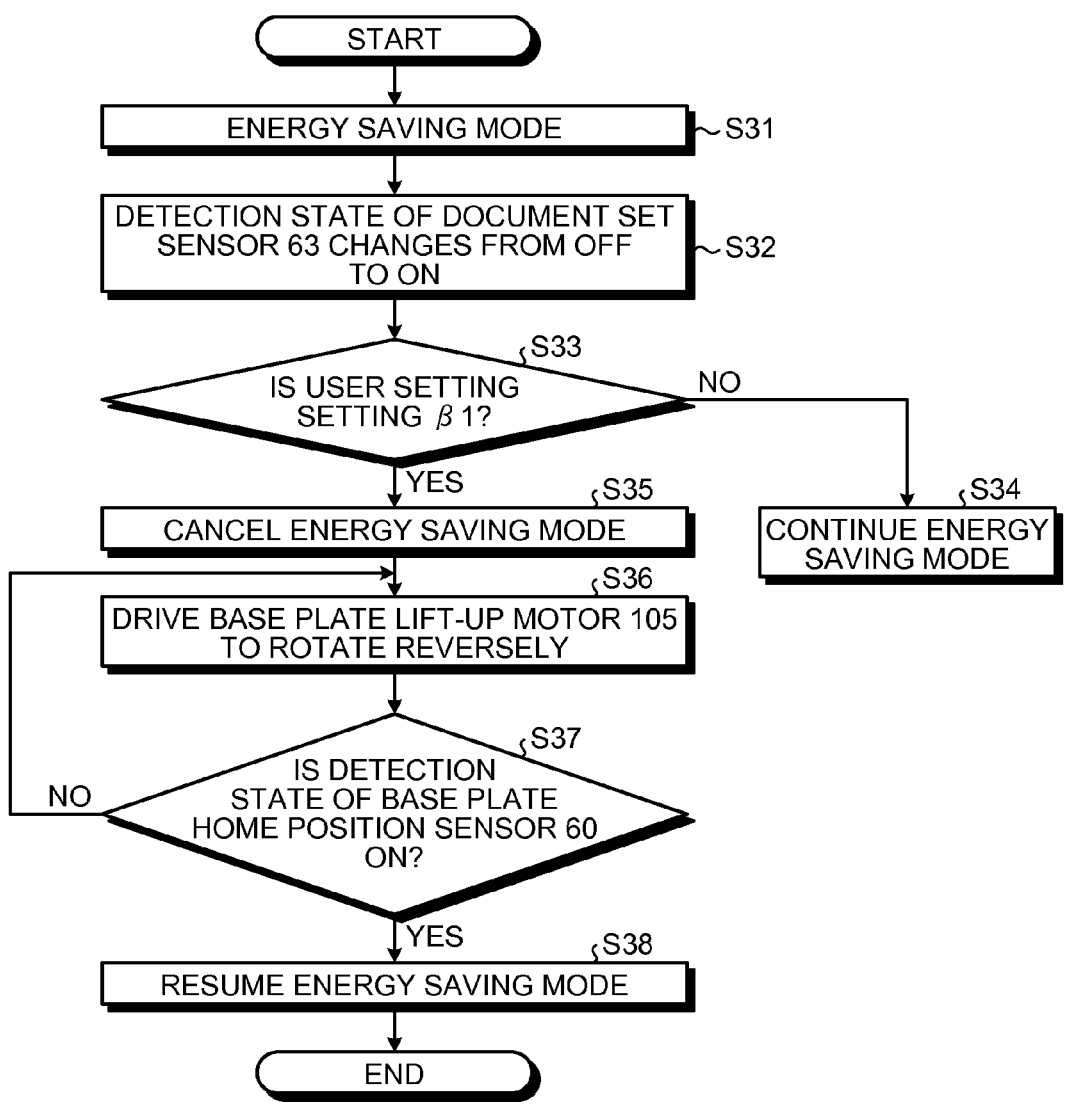

SHEET CONVEYING DEVICE, IMAGE READING DEVICE, AND IMAGE FORMING DEVICE

CROSS-REFERENCE TO RELATED APPLICATIONS

The present application claims priority to and incorporates by reference the entire contents of Japanese Patent Application No. 2012-032061 filed in Japan on Feb. 16, 2012.

BACKGROUND OF THE INVENTION

1. Field of the Invention

The present invention relates to a sheet conveying device that separates sheets one by one and conveys them from a sheet housing unit that houses a plurality of sheets, and an image reading device and an image forming device, which include the sheet conveying device.

2. Description of the Related Art

Image reading devices used as an image reading unit of a copying machine and a scanner conventionally include one that can read a document image by an image reading unit fixed to the device while conveying a sheet-shaped document at a predetermined speed, or read an image in what is called a sheet-through method. The image reading device in the sheet-through method has a mechanism that reads an image while conveying a document; accordingly, one of its characteristics is that productivity can be increased compared with a type that once stops a document for exposure (book type). A document reading device in the sheet-through method includes an automatic document feeder that conveys a document loaded on a document tray to a read position where the image reading unit reads its image.

From the viewpoint of recent year's measures against environmental issues, it is desired to reduce power consumption (save energy) also for an automatic document feeder. Known as a configuration to promote reduction in power consumption is an automatic document feeder that executes a power saving mode that stops supplying power to at least a part of electric mechanisms, such as a motor and a sensor, that requires to be supplied with power when driven, if a drive command is not input for a predetermined time (e.g., Japanese Patent Application Laid-open No. 2000-174978).

In such an automatic document feeder that executes the power saving mode, the power saving mode is cancelled if a predetermined power-saving cancellation condition to be a trigger is satisfied, and the drive mechanisms resume to be supplied with power.

Known is an automatic document feeder that makes use of, as the power-saving cancellation condition, the detection of a change in the detection state of a document detection sensor that detects the presence or absence of a document on a document tray from a document-absent state to a document-present state (hereinafter referred to as the document set detection). In the device, the document detection sensor continues to be supplied with power even in power saving mode, and the user can cancel the power saving mode by a power-saving cancellation operation of placing a document on the document tray.

Moreover, as an automatic document feeder, there is one that includes a pickup roller that applies a conveying force to a document on the document tray, and brings the pickup roller at a position away from the document tray into contact with a top surface of the document on the document tray if the presence of the document on the document tray is detected.

In such an automatic document feeder, if the user places a document, the document detection sensor detects the document-present state, the pickup roller is brought into contact with the document, and the document is nipped by the pickup roller and the document tray. If the user who has placed the document subsequently presses a copy start button, it is possible to start conveying the document simply by rotating the pickup roller. It is possible to shorten the time from the placement of a document to the start of feeding the document compared with one that brings the pickup roller into contact with the top surface of the document after the copy start button is pressed.

The document detection sensor used for the device is to detect the presence or absence of a document at the same position in a document feed direction as, or a position downstream of a nipping position where the pickup roller and the document tray nip the document. This is because even if a document is loaded on the document tray, unless the leading end part of the document reaches the nipping position, the pickup roller cannot apply a conveying force.

If a positional relationship between the pickup roller and the document tray is one of when a document is nipped, a space where the document can be placed on the document tray at the nipping position is very narrow, or there is no such a space. Accordingly, it becomes impossible to place a new document on the document tray. Consequently, it is configured such that when the absence of a document on the document tray is detected, the pickup roller and the document tray are separated to cancel the nipping state. The cancellation of the nipping state makes it possible to place a new document on the document tray.

Known as an automatic document feeder is one that adopts both of the above-mentioned configuration where the document set detection is the power-saving cancellation condition, and a configuration where if the presence of a document on the document tray is detected, the pickup roller is brought into contact with the top surface of the document, and uses the document detection sensor for both the former document set detection and the latter document presence detection. In this automatic document feeder, if a document is placed in the automatic document feeder in the state of the power saving mode, the document detection sensor detects the placement of the document, and the drive mechanisms are supplied with power. At the time of the document set detection, the document detection sensor detects the document-present state; accordingly, the pickup roller is brought into contact with the document to nip the document with the document tray. If the user subsequently presses the copy start button, the document starts to be fed. In this manner, it is possible to realize high operability that enables the start of feeding a document simply by the user placing a document and pressing the copy start button in the state of the power saving mode.

However, the following problems remain in the automatic document feeder that adopts both of the above.

In the automatic document feeder, the user may withdraw a document from the document tray without pressing the copy start button after placing the document. It is in the state of a drive mode where the power saving mode is cancelled, immediately after the placement of the document; however, if a predetermined time passes without the input of a drive command after the placement of the document, it turns to the state of the power saving mode.

If the above-mentioned timing to withdraw the document from the document tray is before a lapse of the predetermined time after the placement of the document, the state of the drive mode is maintained; accordingly, the document detection sensor detects the absence of the document on the document tray, and the nipping state is cancelled.

On the other hand, if the timing to withdraw the document from the document tray is after the predetermined time passes without the input of a drive command after the placement of the document and then a shift is made to the power saving mode, the nipping state is not cancelled even if the document detection sensor detects the absence of the document on the document tray. This is because in power saving mode, an electric mechanism (such as a pickup lift motor) that performs switching between the nipping state to nip a document with the pickup roller and the cancellation of the nipping state is not supplied with power. In this manner, if the nipping state is not cancelled, it is not possible to place the new document on the document tray when a new document is subsequently intended to be placed to be fed, depending on the timing of withdrawing a document from the document tray. If it is not possible to place a document on the document tray, it is not possible to cancel the power saving mode by the power-saving cancellation operation of placing a document.

Consequently, it is necessary for the user to perform another power-saving cancellation operation such as a key operation on an operation panel, on the automatic document feeder that has entered the power saving mode while in the nipping state, apart from the operation of placing the document. In this manner, if the power saving mode is cancelled by another power-saving cancellation operation, the drive mode starts. Accordingly, the document detection sensor detects the absence of a document on the document tray, and the nipping state is cancelled. Therefore, it becomes possible to place a new document on the document tray.

However, when attempting to feed a new document, it is necessary for the user to perform a series of operations of cancelling the power saving mode by another power-saving cancellation operation, then placing a new document after waiting for the automatic document feeder in drive mode cancelling the nipping state based on the document detection sensor's detection of the absence of a document, and pressing the copy start button.

Consequently, there remains problems where, for users who are used to simple operations of placing a document and pressing the copy start button to enable the start of paper feeding when feeding the document, operability is decreased due to another power-saving cancellation operation before the placement of a document, and usability becomes worse due to the extended time necessary from an attempt to place a document to the start of paper feeding.

As a configuration to cancel the nipping state without performing another power-saving cancellation operation other than the placement of a document after the withdrawal of a document in a case where the document is withdrawn from the document tray after a shift is made to the power saving mode, considered is a configuration to set, as a power-saving cancellation condition, a change in the detection state of the document detection sensor from the document-present state to the document-absent state. In such a configuration, if the user withdraws the document, the detection state of the document detection sensor changes from the document-present state to the document-absent state; accordingly, the power saving mode is cancelled to enter the drive mode. In drive mode, the document detection sensor detects the absence of the document on the document tray, and the nipping state is cancelled based on the detection result. After this, even if the power saving mode starts again or the drive mode is maintained, the state where the nipping state has been cancelled is maintained. Accordingly, it is possible to place a new document. Upon next paper feeding, the user can start feeding a document simply by placing the document and pressing the copy start button.

However, after the document is withdrawn from the document tray, a copy operation may not be performed immediately, for example, the document is taken back without performing any more things. Consequently, the adoption of the configuration where the power saving mode is cancelled whenever a document is withdrawn from the automatic document feeder in the state of the power saving mode is not preferable from the viewpoint of low power consumption.

Such a problem is not limited to the automatic document feeder where a sheet to be conveyed is a document. This is a problem that can arise as long as it is a sheet conveying device that nips a sheet if the sheet is placed in a sheet housing unit, the sheet conveying device having a configuration where the power saving mode is cancelled if a sheet is placed in the sheet housing unit in the state of the power saving mode.

In view of the above problem, there is a need to provide a sheet conveying device that can cancel the power saving mode simply by placing a new sheet in the sheet housing unit if a shift is made to the power saving mode in a state where a sheet is left housed in the sheet housing unit, and the sheet that has been housed is subsequently withdrawn, and an image reading device and an image forming device, which include the sheet conveying device.

SUMMARY OF THE INVENTION

It is an object of the present invention to at least partially solve the problems in the conventional technology.

A sheet conveying device includes: a sheet housing unit that houses a sheet; a sheet conveying unit that conveys the sheet to a predetermined conveyance destination position; a sheet detection unit that detects presence or absence of the sheet in the sheet housing unit; a sheet nipping unit that nips the sheet housed in the sheet housing unit; a sheet sending unit that applies a conveying force toward the sheet conveying unit to the sheet nipped by the sheet nipping unit and sends out the sheet; and a control unit that controls drive of electric mechanisms in accordance with an input drive command. The control unit controls the sheet nipping unit to reach a nipping state to nip the sheet in the sheet housing unit upon the sheet detection unit detecting a sheet-present state, and to cancel the nipping state upon detection of absence of the sheet in the sheet housing unit. The control unit executes a power saving mode to stop supplying power to at least a part of the electric mechanisms requiring to be supplied with power when driven, other than the sheet detection unit, when no drive command is input for a predetermined time. A cancellation condition to cancel the power saving mode upon a detection state of the sheet in the sheet housing unit by the sheet detection unit being changed from absent to present during the power saving mode is set. The control unit controls the sheet nipping unit to cancel the nipping state before execution of the power saving mode.

An image reading device includes: a document conveying unit that conveys a document sheet as a sheet; and a conveyed document reading unit that reads a document image of a document sheet conveyed by the document conveying unit. The abovementioned sheet conveying device is used as the document conveying unit.

An image forming device includes: an image reading unit; and an image forming unit that forms an image based on a document image read by the image reading unit. The abovementioned image reading device is used as the image reading unit.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 14 is a flowchart of control of when a document is withdrawn during the energy saving mode after a setting β is selected as a user setting in the copying machine of the modification.

DETAILED DESCRIPTION OF THE PREFERRED EMBODIMENTS

A description will be given of an embodiment where the present invention is applied to an electrophotographic copying machine (hereinafter simply referred to as the copying machine 500).

Firstly, a description will be given of a basic configuration of the copying machine 500 according to the embodiment.

Figure 2:
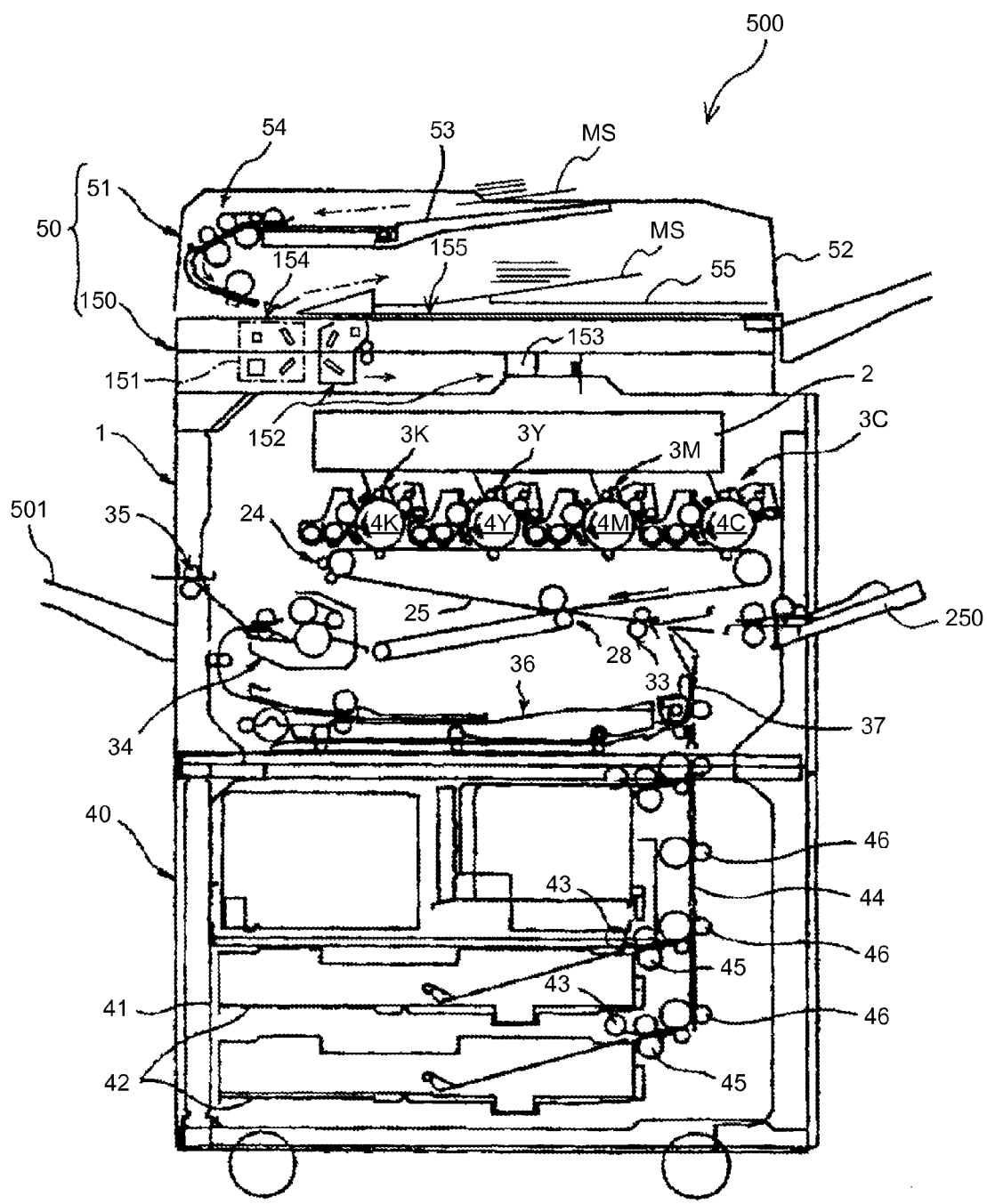
FIG. 2 is a schematic configuration diagram illustrating a copying machine according to an embodiment.

FIG. 2 is a schematic configuration diagram illustrating the copying machine 500. The copying machine 500 includes an image forming unit 1 as an image forming unit, a transfer paper supplying device 40, and an image reading unit 50. The image reading unit 50 as an image reading device includes a scanner 150 fixed on the image forming unit 1, and an automatic document feeder (hereinafter referred to as ADF) 51 as a sheet conveying device supported by the scanner 150.

The transfer paper supplying device 40 includes two transfer paper cassettes 42 arranged in multiple stages in a paper bank 41, a transfer paper sending roller 43 to send out a transfer paper P from the transfer paper cassette 42, a transfer paper separation roller 45 that separates the sent transfer paper P to supply to a transfer paper feed path 44, and the like. Moreover, a main-body side transfer paper feed path 37 as a conveying path of the image forming unit 1 includes a plurality of carriage rollers 47 to convey the transfer paper P as a recording medium. The transfer paper P in the transfer paper cassette 42 is fed into the main-body side transfer paper feed path 37 in the image forming unit 1.

The image forming unit 1 includes an optical writing device 2, four process units 3 (K, Y, M, and C) that form toner images of black, yellow, magenta, and cyan (K, Y, M, and C), a transfer unit 24, a paper conveying unit 28, a pair of registration rollers 33, a fixing device 34, a transfer paper reverse device 36, the main-body side transfer paper feed path 37, and the like. An unillustrated light source, such as a laser diode and an LED, that is arranged in the optical writing device 2 is driven to apply a laser light L to four drum-shaped photosensitive elements 4 (K, Y, M, and C). With the application, electrostatic latent images are formed on the surfaces of photosensitive elements 4 (K, Y, M, and C), and the latent images are developed as the toner images via a predetermined developing process.

Figure 3:
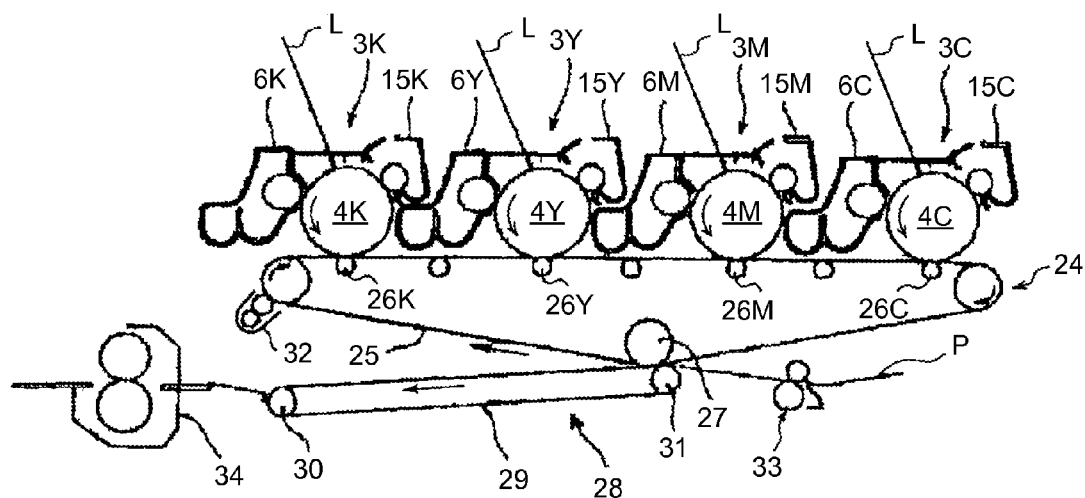
FIG. 3 is a partial configuration diagram enlarging and illustrating a part of an image forming unit in the copying machine.
Figure 4:
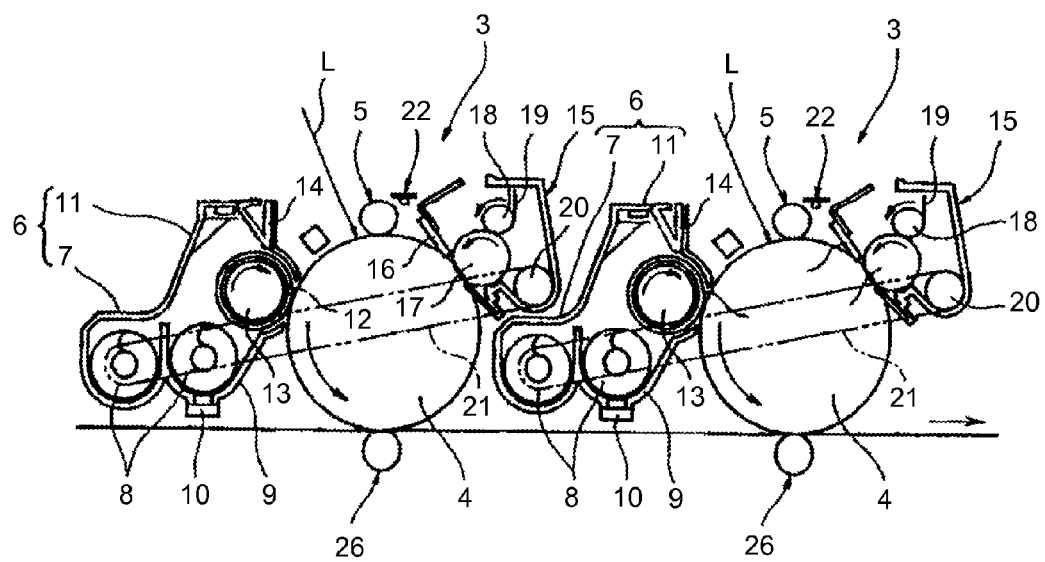
FIG. 4 is a partially enlarged view illustrating a part of a tandem unit including four process units in the image forming unit.

FIG. 3 is a partial configuration diagram enlarging and illustrating a part of the internal configuration of the image forming unit 1. Moreover, FIG. 4 is a partially enlarged view illustrating a part of a tandem unit including the four process units 3 (K, Y, M, and C). The configurations of the four process units 3 (K, Y, M, and C) are substantially similar, apart from a point that the colors of toners to be used by them are different from one another; accordingly, the subscripts, K, Y, M, and C, which are assigned to the reference numerals respectively, are omitted in FIG. 4.

The process units 3 (K, Y, M, and C) are respectively to support the photosensitive element 4 and various devices arranged therearound as one unit with a common supporting member, and are removable from the image forming unit 1 of the main body of the copying machine 500. One process unit 3 includes a charging device 5, a developing device 6, a drum cleaning device 15, a neutralizing lamp 22, and the like around the photosensitive element 4. The copying machine 500 has what is called a tandem configuration where the four process units 3 (K, Y, M, and C) are arranged in a manner opposed to an intermediate transfer belt 25, which is described below, so as to be arranged along its endless movement direction.

Used as the photosensitive element 4 is an aluminum base pipe shaped into a drum where a photosensitive layer is formed by the application of an organic photosensitive material having photosensitivity. However, an endless belt-shaped one may be used.

The developing device 6 is configured to develop a latent image using an unillustrated two-component developer containing a magnetic carrier and a non-magnetic toner. Included are a stirring unit 7 that conveys the two-component developer contained therein to a developing sleeve 12 while stirring the two-component developer, and a developing unit 11 that transfers toner in the two-component developer carried by the developing sleeve 12 to the photosensitive element 4.

The stirring unit 7 is provided at a position lower than the developing unit 11, and includes two conveying screws 8 arranged in parallel with each other, a partition plate provided between these two conveying screws 8, a toner density sensor 10 provided on the underside of a developing case 9, and the like.

The developing unit 11 includes the developing sleeve 12 opposed to the photosensitive element 4 through an opening of the developing case 9, a magnet roller 13 provided in the developing sleeve 12 in a manner incapable of rotating, a doctor blade 14 that brings its end close to the developing sleeve 12, and the like. The developing sleeve 12 is formed into a non-magnetic, rotatable tube shape. The magnet roller 13 has a plurality of magnetic poles sequentially arranged toward the rotation direction of the developing sleeve 12 from a position opposed to the doctor blade 14. These magnetic poles cause the magnetic forces to act on the two-component developer on the developing sleeve 12 at predetermined positions in the rotation direction, respectively. Consequently, the two-component developer sent from the stirring unit 7 is attracted to and carried by the surface of the developing sleeve 12 to form a magnetic brush along magnetic lines of force on the surface of the developing sleeve 12.

The magnetic brush is regulated into an appropriate layer thickness when passing the position opposed to the doctor blade 14 with the rotation of the developing sleeve 12, and is then conveyed to a developing area opposed to the photosensitive element 4. The toner is transferred to the electrostatic latent image by a potential difference between a developing bias applied to the developing sleeve 12 and the electrostatic latent image of the photosensitive element 4 to contribute to development. Furthermore, the two-component developer that formed the magnetic brush, was carried by the developing sleeve 12 and passed the developing area returns inside the developing unit 11 again with the rotation of the developing sleeve 12, leaves from the surface of the sleeve due to the influence of a repulsion magnetic field formed between the magnetic poles of the magnet roller 13, and is then returned to the stirring unit 7. An appropriate amount of toner is added to the two-component developer in the stirring unit 7 based on the detection result of the toner density sensor 10. One using a mono-component developer that does not contain a magnetic carrier instead of the one using the two-component developer may be adopted as the developing device 6.

One using a system that pushes a cleaning blade 16 including an elastic body against the photosensitive element 4 is used as the drum cleaning device 15; however, one with another system may be used. Moreover, in the embodiment, for the purpose of improving cleanability, adopted is a system including a far brush 17 with contact conductivity to bring its outer peripheral surface into contact with the photosensitive element 4 in a freely rotatable manner in an arrow direction in the drawing. The far brush 17 plays also a role to scrape a lubricant from an unillustrated solid lubricant, reducing it to impalpable powder, and applying it to the surface of the photosensitive element 4. A metal magnetic field roller 18 that applies a bias to the far brush 17 is provided in a freely rotatable manner in the arrow direction in the drawing. An end of a scraper 19 is pushed against the magnetic field roller 18. The tonner attached to the far brush 17 is transferred to the magnetic field roller 18 to which a bias is applied while rotating in contact with the far brush 17 in a counter direction.

After being scraped off by the scraper 19 from the magnetic field roller 18, the toner falls down on a collection screw 20. The collection screw 20 conveys the collected toner to an end of the drum cleaning device 15 in a direction orthogonal to the space of the drawing, and passes the collected toner to an external recycling conveying device 21. The recycling conveying device 21 sends the passed collected tonner to the developing device 6 for recycling.

The neutralizing lamp 22 neutralizes the surface of the photosensitive element 4 by light irradiation. After the neutralized surface of the photosensitive element 4 is uniformly charged by the charging device 5, an optical write process is performed thereon by the optical writing device 2. In the copying machine 500, one that rotates the charging roller to which a charging bias is applied while bringing the charging roller into contact with the photosensitive element 4 is used as the charging device 5. However, a scorotron charger that performs a charging process in noncontact with the photosensitive element 4, or the like may be used.

In FIG. 3 illustrated above, K, Y, M, and C tonner images are formed on the photosensitive elements 4 (K, Y, M, and C) of the four process units 3 (K, Y, M, and C) by the hitherto described processes.

The transfer unit 24 is arranged below the four process units 3 (K, Y, M, and C). The transfer unit 24 moves the intermediate transfer belt 25 extended by a plurality of rollers endlessly in a clockwise direction in the drawing while bringing the intermediate transfer belt 25 into contact with the photosensitive elements 4 (K, Y, M, and C). Consequently, primary transfer nips for K, Y, M, and C, in which the photosensitive elements 4 (K, Y, M, and C) comes in contact with the intermediate transfer belt 25, are formed. Primary transfer rollers 26 (K, Y, M, and C) arranged inside the belt loop press the intermediate transfer belt 25 toward the photosensitive elements 4 (K, Y, M, and C) in the vicinity of the primary transfer nips for K, Y, M, and C. A primary transfer bias is applied by an unillustrated power supply to these primary transfer rollers 26 (K, Y, M, and C), respectively. Consequently, primary transfer electric fields to move the toner images on the photosensitive elements 4 (K, Y, M, and C) with static electricity toward the intermediate transfer belt 25 are formed in the primary transfer nips for K, Y, M, and C. With endless movement in the clockwise direction in FIG. 3, the toner images are sequentially superimposed in the respective primary transfer nips to be primarily transferred to a front side of the intermediate transfer belt 25 that sequentially passes the primary transfer nips for K, Y, M, and C. With the first transfer of superimposition, a four-color superimposed toner image (hereinafter referred to as the four-color toner image) is formed on the front side of the intermediate transfer belt 25.

The paper conveying unit 28 across which an endless-shaped paper conveying belt 29 hangs for endless movement is provided between a driving roller 30 and a secondary transfer roller 31 below the transfer unit 24 in the drawing. The intermediate transfer belt 25 and the paper conveying belt 29 are held between the secondary transfer roller 31 and a lower part extension roller 27 of the transfer unit 24. Consequently, a secondary transfer nip in which the front side of the intermediate transfer belt 25 comes in contact with a front side of the paper conveying belt 29 is formed. A secondary transfer bias is applied by an unillustrated power supply to the secondary transfer roller 31. On the other hand, the lower part extension roller 27 of the transfer unit 24 is grounded. Consequently, a secondary transfer electric field is formed in the secondary transfer nip.

A pair of registration rollers 33 is arranged on the right side of the secondary transfer nip in the drawing. Moreover, an unillustrated registration roller sensor is arranged in the vicinity of an entrance of a registration nip of the pair of registration rollers 33. With regard to the transfer paper P conveyed from the transfer paper supplying device 40 to the pair of registration rollers 33, the transfer paper P temporarily stops to be conveyed after a predetermined time after its leading end is detected by the unillustrated registration roller sensor, and the leading end abuts on the registration nip of the pair of registration rollers 33. As a result, the position of the transfer paper P is modified to be ready for synchronization with image formation.

If the leading end of the transfer paper P abuts on the registration nip, the pair of registration rollers 33 resumes roller rotation drive at a timing when the transfer paper P can be synchronized with the four-color toner image on the intermediate transfer belt 25 to send the transfer paper P to the secondary transfer nip. In the secondary transfer nip, the four-color toner image on the intermediate transfer belt 25 is secondarily transferred all together to the transfer paper P by the influence of the secondary transfer electric field and nip pressure. Accordingly, combined with white of the transfer paper P, a full color image is obtained. The transfer paper P that has passed the secondary transfer nip moves away from the intermediate transfer belt 25, and while being held on the front side of the paper conveying belt 29, is conveyed to the fixing device 34 with its endless movement.

The transfer residual toner that has not been transferred to the transfer paper P in the secondary transfer nip is attached on the front side of the intermediate transfer belt 25 that has passed the secondary transfer nip. The transfer residual toner is scraped off and removed by a belt cleaning device 32 whose cleaning member is in contact with the intermediate transfer belt 25.

The full color image is fixed by pressure and heat in the fixing device 34 onto the transfer paper P conveyed to the fixing device 34. The transfer paper P is sent from the fixing device 34 to a pair of discharging rollers 35, and is then discharged to a discharge tray 501 outside the machine.

As illustrated in FIG. 2, the transfer paper reverse device 36 is arranged below the paper conveying unit 28 and the fixing device 34. Consequently, for duplex printing, a conveying path of the transfer paper P on one side of which the image fixing process has been finished is switched by a switching claw to the transfer paper reverse device 36 side, and the transfer paper P is reversed there to enter the secondary transfer nip again. After the secondary transfer process and the fixing process of an image are performed on the other side of the transfer paper P, the transfer paper P is discharged onto the discharge tray 501.

Next, a description will be given of the image reading unit 50 fixed on the image forming unit 1.

The image reading unit 50 including the scanner 150 and the ADF 51 fixed thereon includes two fixed image reading units to be described below and a moving reading unit 152. The moving reading unit 152 is arranged directly below a second exposure glass 155 fixed to an upper wall of a casing of the scanner 150 so as to contact a document MS, and can move an optical system including a light source and reflecting mirrors in a left and right direction in the drawing. In the course of moving the optical system from left to right in the drawing, light emitted from the light source is reflected on the underside of the document MS loaded on the second exposure glass 155, and is then received by an image reading sensor 153 fixed to the scanner 150 via a plurality of reflecting mirrors.

On the other hand, the image reading unit 50 includes, as the fixed image reading units, a first fixed reading unit 151 arranged in the scanner 150, and a second fixed reading unit 95 arranged in the ADF 51, which is described below. The first fixed reading unit 151 including a light source, reflecting mirrors, an image reading sensor such as a CCD is arranged directly below a first exposure glass 154 fixed on the upper wall of the casing of the scanner 150 so as to contact the document MS. When the document MS conveyed by the ADF 51 passes over the first exposure glass 154, light emitted from the light source is received by the image reading sensor 153 via a plurality of reflecting mirrors while being successively reflected on a first side of the document MS. Consequently, the first side of the document MS is scanned without moving the optical system including the light source and the reflecting mirrors. Moreover, the second fixed reading unit 95 scans a second side of the document MS that has passed the first fixed reading unit 151.

The ADF 51 arranged on the scanner 150 includes a main-body cover 52 that holds a document loading plate 53 to load the document MS that is yet to be read, a document conveying unit 54 that conveys the document MS as a sheet, a document stacking plate 55 that stacks the document MS that has been read.

Figure 5:
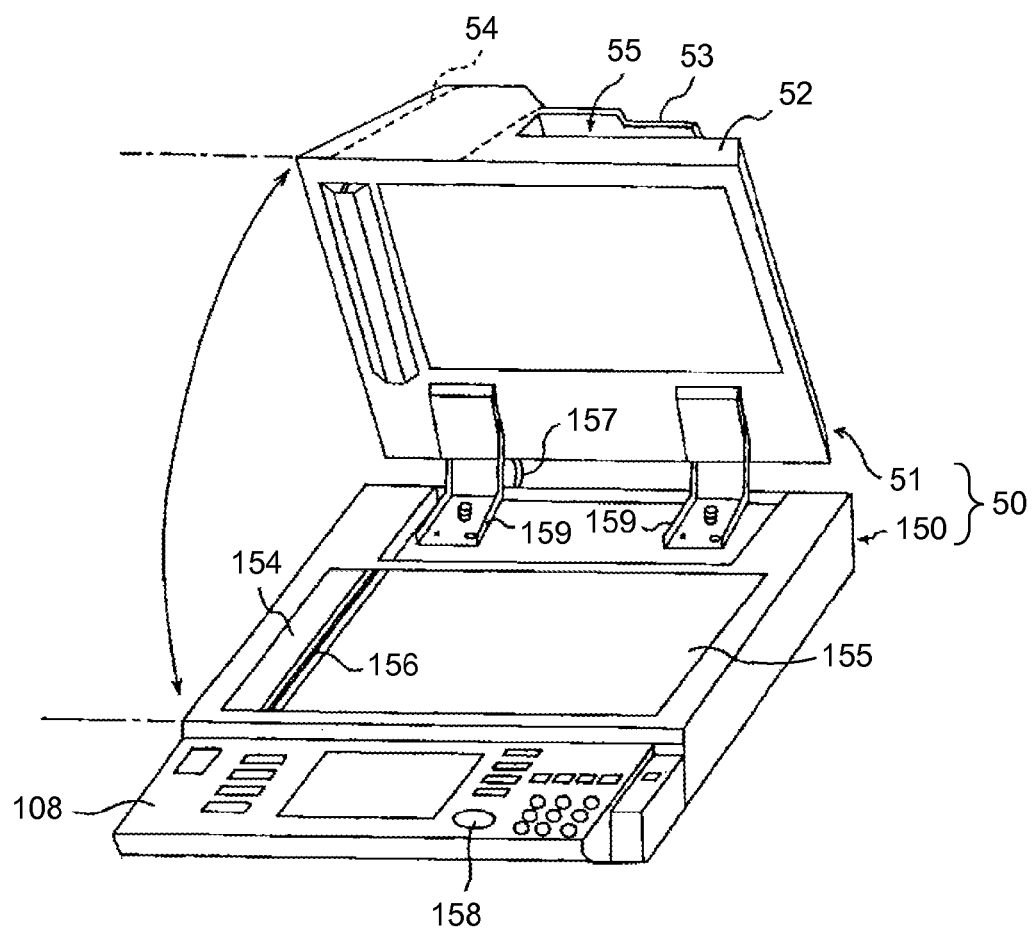
FIG. 5 is a perspective view illustrating a scanner and the ADF of the copying machine.

FIG. 5 is a perspective explanatory view of the image reading unit 50. As illustrated in FIG. 5, a hinge 159 fixed to the scanner 150 supports the ADF 51 swingably in an up and down direction. The ADF 51 then moves similarly to an open/close door by swinging, and exposes the first exposure glass 154 and the second exposure glass 155 on the top surface of the scanner 150 in the opened state.

In a case of one-sided bound documents such as a book being a bundle of documents bound at one corner, the documents cannot be separated one by one; accordingly, the conveyance cannot be performed by the ADF 51. Hence, in the case of the one-sided bound documents, after the ADF 51 is opened as illustrated in FIG. 5, the one-sided bound documents in which a page desired to be read is open are loaded faced down on the second exposure glass 155, and the ADF 51 is closed. The moving reading unit 152 of the scanner 150, which is illustrated in FIG. 2, is caused to read the image of the page. A left scale 156 is disposed at the left end of the second exposure glass 155. The document is loaded on the second exposure glass 155 in a manner of abutting, in alignment with the scale of the left scale 156 to read the image.

On the other hand, in a case of a bundle of documents being a plurality of the documents MS that is independent from each other and is simply stacked, it is possible to cause the first fixed reading unit 151 in the scanner 150 and the second fixed reading unit 95 in the ADF 51 to read the documents MS successively while the ADF 51 automatically conveying the documents MS one by one. In this case, the user who attempts to copy the document images presses a copy start button 158 of an operating unit 108 after placing the bundle of documents on the document loading plate 53. The ADF 51 then sends the documents MS being the bundle of documents loaded on the document loading plate 53 sequentially from the top into the document conveying unit 54, and conveys them to the document stacking plate 55 while reversing them. In the course of the conveyance, the document MS is passed directly above the first fixed reading unit 151 of the scanner 150 immediately after being reversed. At this point, an image on the first side of the document MS is read by the first fixed reading unit 151 of the scanner 150.

Next, a description will be given of the ADF 51.

Figure 6:
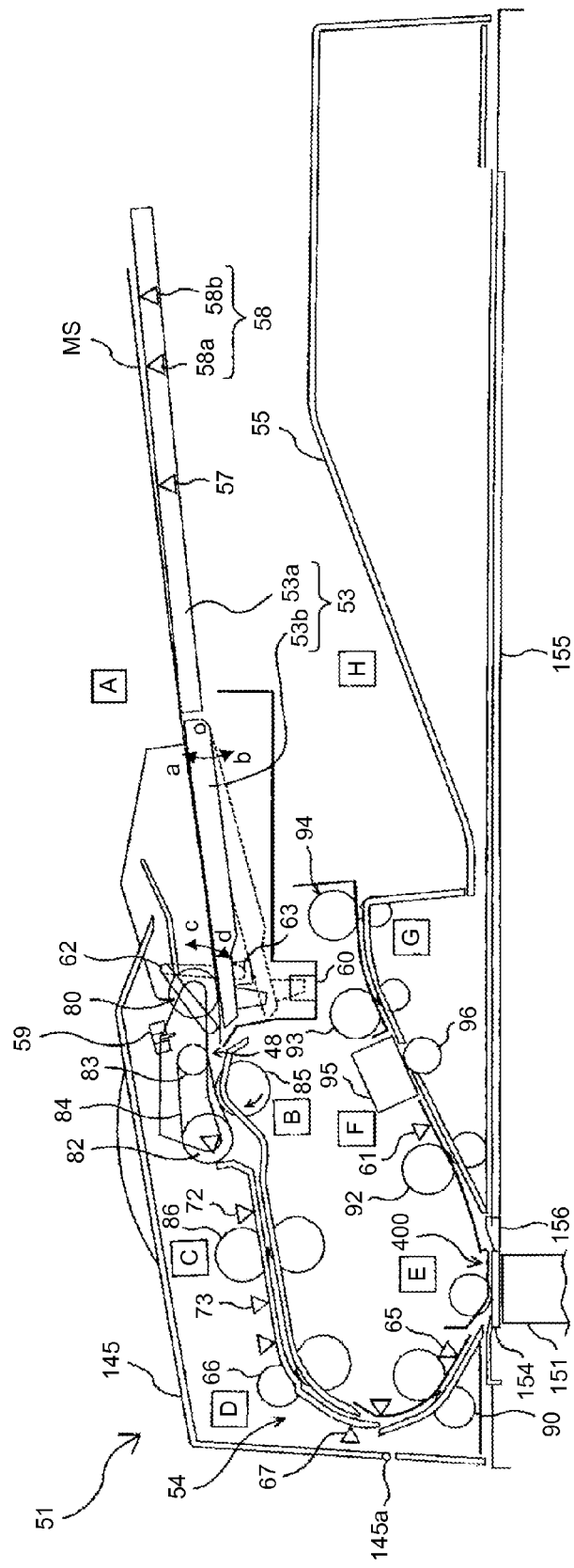
FIG. 6 is a schematic configuration diagram illustrating the ADF of the embodiment together with an upper part of the scanner.

FIG. 6 is an enlarged configuration diagram illustrating the main configuration of the ADF 51 together with an upper part of the scanner 150. The ADF 51 includes a document placement unit A, a separating conveying unit B, a registration unit C, a turn unit D, a first scan conveying unit E, a second scan conveying unit F, a discharging unit G, a stacking unit H, and the like. The document conveying unit 54 of the ADF 51 of the embodiment is a portion that configures a path, through which the document MS is conveyed, from a detection position by an abutting sensor 72 downstream of the separating conveying unit B to a pair of scanning entrance rollers 90.

Moreover, the ADF 51 includes a paper feeding unit cover 145 that opens and closes the paper feed path up to the separating conveying unit B, the registration unit C, and the midpoint of the turn unit D by rotating around a cover rotation center 145a relative to the main body of the device.

The document placement unit A includes the document loading plate 53 on which a bundle of the documents MS is placed such that the first sides of the documents MS face up, and the like. The separating conveying unit B is to separate the documents MS one by one from the placed bundle of the documents MS and feed them. The registration unit C serves a function of primary alignment of the fed documents MS, and a function of drawing out and conveying the aligned documents MS. The turn unit D includes a curved conveying unit that curves in C-shape, and is to turn the document MS upside down while turning the document MS back in the curved conveying unit, and then orient the first side of the document MS downward.

The first scan conveying unit E is to cause the first fixed reading unit 151 arranged in the scanner 150 to read the first side of the document MS from below the first exposure glass 154 while conveying the document MS on the first exposure glass 154.

The second scan conveying unit F is to cause the second fixed reading unit 95 to read the second side of the document MS while conveying, by a second reading roller 96 disposed below the second fixed reading unit 95, the document MS that has passed a read position by the first fixed reading unit 151.

Moreover, the discharging unit G is to discharge, toward the stacking unit H, the document MS that has passed the read position by the first fixed reading unit 151 and a read position by the second fixed reading unit 95. The stacking unit H is to load and nip the document MS on the document stacking plate 55 after reading is completed.

Figure 7:
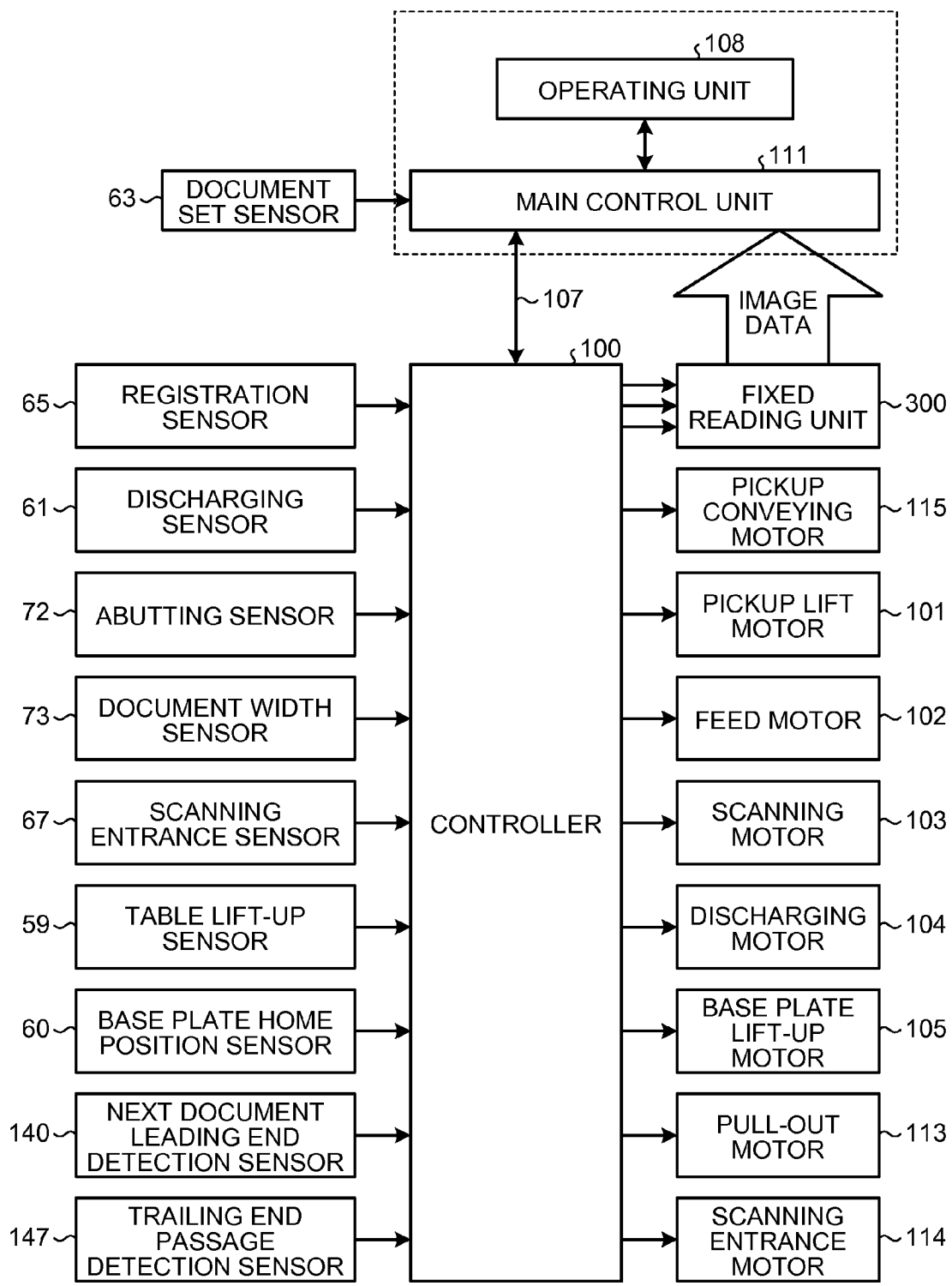
FIG. 7 is a control block diagram of the entire ADF.

FIG. 7 is a control block diagram of the entire ADF 51. A control unit of the ADF 51 is configured of a controller 100 that controls a series of operations of motors (101 to 105, 113, and 114) being driving units that provide drive for the operation of conveying a document, various sensor units, a fixed image reading unit 300 (the first fixed reading unit 151 or the second fixed reading unit 95), and the like, and the like.

Figure 8:
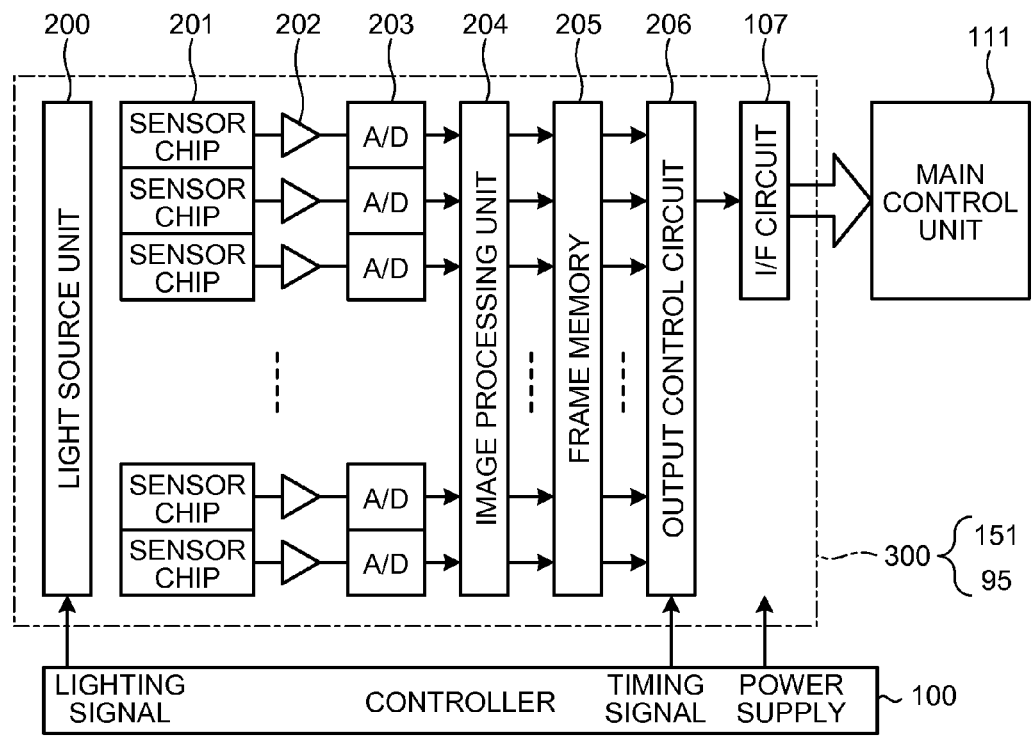
FIG. 8 is a block diagram illustrating the main parts of an electric circuit of a fixed image reading unit.

FIG. 8 is a block diagram illustrating the main parts of an electric circuit of the fixed image reading unit 300. The fixed image reading unit 300 is configured of a light source unit 200, sensor chips 201, an image processing unit 204, a frame memory 205, an output control circuit 206, and the like.

The light source unit 200 includes an LED array, fluorescent light, cold-cathode tube, or the like. Moreover, the plurality of sensor chips 201 is disposed, being arranged in a main-scanning direction (a direction corresponding to a document width direction). A plurality of OP-amp circuits 202 is connected to the plurality of sensor chips 201, respectively. Furthermore, a plurality of AD converters 203 is connected to the plurality of OP-amp circuits 202, respectively.

The sensor chip 201 includes a photoelectric conversion element called a same size contact image sensor, and a condenser lens. Before the document MS enters a read position by the fixed image reading unit 300, a lighting signal is transmitted from the controller 100 to the light source unit 200. Consequently, the light source unit 200 lights up, and the surface (the first side in the case of the first fixed reading unit 151, and the second side in the case of the second fixed reading unit 95) of an unillustrated document is irradiated with the light. The reflected light reflected by the surface of the document MS is condensed by the condenser lenses to the optoelectric conversion elements in the plurality of sensor chips 201, and is read as image information. The image information read by the respective sensor chips 201 is amplified by the OP-amp circuits 202, and is then converted by the AD converters 203 into digital image information.

The digital image information obtained in this manner is input into the image processing unit 204, subjected to shading correction and the like, and is temporarily stored in the frame memory 205. The digital image information is subsequently converted by the output control circuit 206 into a data format that can be accepted by a main control unit 111 (a control unit of the main body of the copying machine 500), and is then output as image data to the main control unit 111 via an I/F circuit 107. The controller 100 is configured to output a timing signal to notify a timing when the leading end of the document MS reaches the read position by the fixed image reading unit 300 (image data received after that timing is handled as valid data), a lighting signal of the light source, power supply, and the like.

A bundle of the documents MS to be read is placed on the document loading plate 53 in a state of being loaded with the first side up. The document loading plate 53 is configured of a movable document table 53b that supports the leading end side of the document MS and can swing in an arrows a-b direction in FIG. 6 in accordance with the thickness of the bundle of the documents MS, and a fixed document table 53a that supports a trailing end side of the document MS. When the document MS is placed on the document loading plate 53, both ends in its width direction (a direction orthogonal to a feed direction of the document MS and a direction orthogonal to the space of FIG. 6) are abutted by unillustrated side guides, respectively, on the document loading plate 53. Accordingly, the document MS is positioned in the width direction.

The document MS placed on the document loading plate 53 in this manner presses up a set feeler 62 being a lever member arranged swingably above the movable document table 53b. With this, a document set sensor 63 detects the placement of the document MS, and transmits a detection signal to the controller 100. The detection signal is then transmitted from the controller 100 to the main control unit 111 of the image reading unit 50 via the interface circuit (hereinafter referred to as the I/F circuit 107).

Moreover, a plurality of document length sensors (57, 58a, and 58b) each comprising a reflective photo sensor that detects the length of the document MS in the feed direction or an actuator sensor that can detect even one sheet of a document is disposed in the fixed document table 53a. The estimation of the length of the document MS in the feed direction is determined by these document length sensors (at least the sensor arrangement that can judge whether it is the length or width of the same document size is necessary).

A pickup roller 80 is disposed above the movable document table 53b. Drive is transmitted from a pickup conveying motor 115 to drive and rotate the pickup roller 80. Moreover, drive is transmitted from a feed motor 102 to drive and rotate a paper feeding belt 84 and a reverse roller 85, which configure a separation nip as a separating unit.

The movable document table 53b is swung in the arrow a-b direction in FIG. 6 by a cam mechanism driven by the drive of a base plate lift-up motor 105. If the set feeler 62 and the document set sensor 63 detect that the document MS has been placed on the document loading plate 53, the controller 100 rotates the base plate lift-up motor 105 forward and raises the movable document table 53b so as to bring the topmost surface of the bundled documents MS into contact with the pickup roller 80.

The pickup roller 80 is configured to be movable in an arrows c-d direction in FIG. 6 by a cam mechanism driven by a pickup lift motor 101. Moreover, if being pressed by the top surface of the documents MS on the movable document table 53b, following the ascent of the movable document table 53b, in a state of having descended in the arrow d direction in FIG. 6, the pickup roller 80 ascends in the arrow c direction in the drawing. A table lift-up sensor 59 detects this to detect the ascent of the movable document table 53b up to its upper limit. Consequently, the pickup lift motor 101 stops as well as the base plate lift-up motor 105 stops. The document MS is nipped between the movable document table 53b and the pickup roller 80. In the embodiment, both of the movable document table 53b and the pickup roller 80 include a lift mechanism; however, a mechanism that nips the document MS may be configured to include a lift mechanism in either the movable document table 53b or the pickup roller 80.

If in a state where the document MS has been placed on the document loading plate 53, a duplex scanning mode or single-sided scanning mode is specified, and the copy start button 158 of the operating unit 108 is pressed, a document feed signal is transmitted from the main control unit 111 to the controller 100 being the control unit of the ADF 51 via the I/F circuit 107. Consequently, the pickup conveying motor 115 and the feed motor 102 are driven in a forward direction. The pickup roller 80 is driven and rotated by the forward rotation of the pickup conveying motor 115 to pick up several sheets (ideally, one sheet) of the documents MS on the document loading plate 53. The rotation direction of the pickup roller 80 at this point is a direction to convey the topmost document MS to the separating conveying unit B.

Here, when the duplex scanning mode or single-sided scanning mode is set, all the documents MS placed on the document loading plate 53 may have the same setting, or (the first sheet, the second sheet, . . . the n-th sheet of) the documents MS may have different settings, respectively. For example, out of 10 sheets in total of the documents MS, the first and tenth sheets of the documents MS are set to duplex scanning mode, and the other documents MS are set to single-sided scanning mode.

The document MS sent by the pickup roller 80 enters the separating conveying unit B to be sent to a separation entrance 48 of the separation nip being a contact position of the paper feeding belt 84 and the reverse roller 85. The paper feeding belt 84 is extended by a paper feed driving roller 82 and a paper feed driven roller 83, and is endlessly moved by the rotation of the paper feed driving roller 82 with the forward rotation of the feed motor 102, in a paper feeding direction (a clockwise direction in FIG. 6).

The lower extended surface of the paper feeding belt 84 is in contact with the reverse roller 85. The drive to rotate in an opposite direction to the paper feeding direction (the clockwise direction in FIG. 6) is transmitted to the reverse roller 85 by the forward rotation of the feed motor 102. In this manner, it is configured such that the surface movement direction in the separation nip of the paper feeding belt 84 and the reverse roller 85 is the opposite direction; accordingly, only the topmost sheet of the documents MS can be fed.

Specifically, the surface of the paper feeding belt 84 moves in the paper feeding direction in the separation nip being the contact portion of the paper feeding belt 84 and the reverse roller 85. On the other hand, the surface of the reverse roller 85 attempts to move in the opposite direction to the paper feeding direction; however, there is an unillustrated torque limiter in a drive transmission unit of the reverse roller 85. Hence, if the force toward the paper feeding direction is larger than the torque of the torque limiter, the reverse roller 85 rotates in a counterclockwise direction in FIG. 6 so as to move along the surface in the paper feeding direction.

The reverse roller 85 is biased by a pressure unit whose illustration is omitted so as to contact the paper feeding belt 84 at a predetermined pressure. The reverse roller 85 is then dragged by the paper feeding belt 84 or the document MS in a state of being in direct contact with the paper feeding belt 84, or a state of being in contact with the paper feeding belt 84 via only one sheet of the documents MS (a state where only one sheet of the documents MS is nipped by the separation nip), and rotates in the counterclockwise direction in FIG. 6. On the other hand, when two or more sheets of the documents MS are nipped by the separation nip, the torque limiter is set such that the drag force is smaller than the torque of the torque limiter. Accordingly, the reverse roller 85 is driven and rotated in the clockwise direction in FIG. 6, which is the opposite direction to the drag direction. Consequently, a moving force in the opposite direction to the paper feeding direction is applied by the reverse roller 85 to the documents MS other than the topmost document MS among the documents MS conveyed to the separating conveying unit B. They are then pushed back. Accordingly, only the topmost document MS is separated from several sheets of the documents to prevent multiple sheet feed.

The document MS that has been separated alone by the operations of the paper feeding belt 84 and the reverse roller 85 enters the registration unit C. The document MS is further sent by the paper feeding belt 84. Its leading end is detected by the abutting sensor 72. The document MS further continues to butt against a pair of pull-out rollers 86 being at rest. The feed motor 102 that is being driven at this point is driven only for a predetermined time after the detection of the leading end by the abutting sensor 72, and is then stopped. Consequently, the document MS is sent by a predetermined amount of a specified distance from the detection position by the abutting sensor 72. As a result, the paper feeding belt 84 stops conveying the document MS in a state where the document MS is pushed against the pair of pull-out rollers 86 with a predetermined amount of bending.

The pickup lift motor 101 is rotated when the leading end of the document MS is detected by the abutting sensor 72. Accordingly, the pickup roller 80 is retracted from the top surface of the document MS, and the document MS is sent only by the conveying force of the paper feeding belt 84. Consequently, the leading end of the document MS enters a nip formed by the top and bottom rollers of the pair of pull-out rollers 86, and the alignment of the leading end (skew correction) is performed.

The pair of pull-out rollers 86 is a pair of rollers having a skew correction function as described above as well as being to convey the document MS on which skew correction is performed after separation, to a pair of intermediate rollers 66. Moreover, a pull-out motor 113 is driven to drive and rotate one of the two rollers composing the pair of pull-out rollers 86.

The driving source of the pair of pull-out rollers 86 may be the feed motor 102. In such a case, it is configured such that drive is transmitted to the paper feeding belt 84 and the reverse roller 85 when the feed motor 102 is rotated forward, and drive is transmitted to the pair of pull-out rollers 86 when the feed motor 102 is rotated reversely. However, as in the embodiment, the pair of pull-out rollers 86 is driven by the pull-out motor 113 being an independent driving source; accordingly, it becomes possible to shorten rise and fall times of the motors, and productivity improves.

The document MS sent by the pair of pull-out rollers 86 passes directly below a document width sensor 73. The document width sensor 73 is a sensor in which a plurality of paper detection sensors each comprising a reflective photo sensor or the like is arranged in the document width direction (a direction orthogonal to the space of FIG. 6), and detects the size of the document MS in the width direction based on which paper detection sensor detects the document MS. Moreover, the length of the document MS in the feed direction is detected from motor pulses based on the timings from when the leading end of the document MS is detected by the abutting sensor 72 until when the document MS is no longer detected by the abutting sensor 72 (the trailing end of the document MS passes).

The document MS conveyed by the rotary drive of the pair of pull-out rollers 86 and the pair of intermediate rollers 66 enters the turn unit D to be conveyed by the pair of intermediate rollers 66 and the pair of scanning entrance rollers 90.

The pair of intermediate rollers 66 is configured such that drive is transmitted from both motors of the pull-out motor 113 being the driving source of the pair of pull-out rollers 86, and a scanning entrance motor 114 being the driving source of the pair of scanning entrance rollers 90. Included therein is a mechanism where the rotation speed of the rollers composing the pair of intermediate rollers 66 is decided by the drive of a motor on a side where its rotation speed becomes faster out of the two motors.

In the ADF 51, the feed speed in the registration unit C is set to a higher speed than the feed speed in the first scan conveying unit E when the document MS is conveyed by the rotary drive of the pair of pull-out rollers 86 and the pair of intermediate rollers 66 from the registration unit C to the turn unit D. The shortening of the process time to send the document MS to the first scan conveying unit E is promoted. At this point, the pair of intermediate rollers 66 rotates using the pull-out motor 113 as a driving source.

If the leading end of the document MS is detected by a scanning entrance sensor 67, the pull-out motor 113 starts decelerating. At the same time, the scanning entrance motor 114 and a scanning motor 103 are driven and rotated forward. The scanning entrance motor 114 is driven and rotated forward to drive and rotate the pair of scanning entrance rollers 90 in the feed direction. Moreover, the scanning motor 103 is driven and rotated forward to drive and rotate a pair of scanning exit rollers 92 and a pair of second scanning exit rollers 93 in the feed direction, respectively.

If the start of the driving of the scanning entrance motor 114 and the deceleration of the pull-out motor 113 makes the rotation speed of the pair of intermediate rollers 66 to which drive is transmitted from the scanning entrance motor 114 faster than the rotation speed of the pair of intermediate rollers 66 to which drive is transmitted from the pull-out motor 113, the pair of intermediate rollers 66 is driven and rotated using the scanning entrance motor 114 as the driving source. Consequently, it is possible to make the feed speed of the document MS equal to the feed speed in the first scan conveying unit E before the leading end of the document MS enters a nip formed by the top and bottom rollers of the pair of scanning entrance rollers 90.

If the leading end of the document MS moving from the turn unit D to the first scan conveying unit E is detected by a registration sensor 65, the controller 100 decelerates the drive of the motors over a predetermined time to reduce the feed speed of the document MS over a predetermined feed distance. The controller 100 then performs control to temporarily stop the document MS before a first read position 400 where the first fixed reading unit 151 reads an image on the first side of the document MS. Furthermore, in conjunction with this, a registration stop signal is transmitted to the main control unit 111 via the I/F circuit 107.

If the controller 100 subsequently receives a read start signal from the main control unit 111, the drive of the scanning entrance motor 114 and the scanning motor 103 is controlled such that the feed speed of the document MS rises to a predetermined feed speed by the time when the document leading end of the document MS that has stopped for registration reaches the first read position 400. Consequently, the document MS is conveyed to the first read position 400 while its feed speed is increased. A gate signal indicating an effective image area in a sub-scanning direction on the first side of the document MS is then transmitted from the controller 100 to the main control unit 111 at a timing when the leading end of the document MS reaches the first read position 400, the timing being calculated based on the pulse count of the scanning entrance motor 114. The gate signal continues to be transmitted until the trailing end of the document MS exits the first read position 400, and the first side of the document MS is read by the first fixed reading unit 151.

Moreover, as illustrated in FIG. 6, the top surface of the left scale 156 slopes such that the height on the left end side is lower. Consequently, the leading end of the document MS that has passed the first read position 400 is scooped by the slope of the left scale 156, and heads for a nip of the pair of scanning exit rollers 92.

In order to improve productivity, the speed may be controlled so as to be reduced to a predetermined speed at the pair of scanning entrance rollers 90, and reach a predetermined reading speed before arrival at the first read position 400 without a temporary stop before the first read position 400. At this point, a difference in linear speed is produced in the pair of scanning entrance rollers 90; accordingly, the bending of the document MS occurs at the pair of scanning entrance rollers 90 and upstream thereof, and it becomes possible to correct a skew.

After the document MS that has passed through the first scan conveying unit E passes the nip of the pair of scanning exit rollers 92, its leading end is detected by a discharging sensor 61, and further the document MS subsequently passes through the second scan conveying unit F to be conveyed to the discharging unit G.

In the case of the single-sided scanning mode that reads a one side (first side) of the document MS, it is unnecessary for the second fixed reading unit 95 to read the second side of the document MS. Hence, if the leading end of the document is detected by the discharging sensor 61, a discharging motor 104 starts being driven and rotated forward to drive and rotate a discharging roller of a pair of discharging rollers 94, which is on the upper side in the drawing, in the counterclockwise direction in the drawing. Moreover, the timing when the trailing end of the document MS exits a nip of the pair of discharging rollers 94 is computed based on the pulse count of the discharging motor 104 after the leading end of the document MS is detected by the discharging sensor 61. Based on the computation result, it is controlled such that the drive speed of the discharging motor 104 is reduced at a timing immediately before the trailing end of the document MS exits the nip of the pair of discharging rollers 94, and the document MS is discharged at a speed not to fly out of the document stacking plate 55.

On the other hand, in the case of the duplex scanning mode that reads both sides (first and second sides) of the document MS, after the leading end of the document MS is detected by the discharging sensor 61, timings until arrival at the second fixed reading unit 95 are computed based on the pulse count of the scanning motor 103. At the timings, a gate signal indicating an effective image area in the sub-scanning direction on the second side of the document MS is transmitted from the controller 100 to the main control unit 111. The gate signal continues to be transmitted until the trailing end of the document MS exits a second read position by the second fixed reading unit 95, and the second side of the document MS is read by the second fixed reading unit 95.

The second fixed reading unit 95 as a scanning unit comprises a contact image sensor (CIS), and a coating process is performed on a read side for the purpose of preventing a read vertical line made by a paste-like foreign substance attached to the document MS being attached to the read side. Moreover, the second reading roller 96 as a document supporting unit that supports the document MS from a non-read side (first side) is arranged at a position opposed to the second fixed reading unit 95 across the conveying path through which the document MS passes. The second reading roller 96 plays a role to suppress the floating of the document MS at the second read position by the second fixed reading unit 95 as well as functioning as a reference white unit that acquires shading data in the second fixed reading unit 95.

Moreover, in the embodiment, the two fixed image reading units 300 of the first fixed reading unit 151 and the second fixed reading unit 95 are included as conveyed document scanning units that read the image of the document MS to be conveyed. A configuration to read the images on both sides of the document MS is not limited to a configuration including the two fixed image reading units 300, but may be a configuration where the document MS whose front side has been read by one fixed image reading unit 300 is switched back, and its back side is read at the time of passing the read position of the fixed image reading unit 300 again.

Next, a description will be given of the operations of the movable document table 53b and the pickup roller 80 of when the document MS is placed in the ADF 51.

Figure 1:
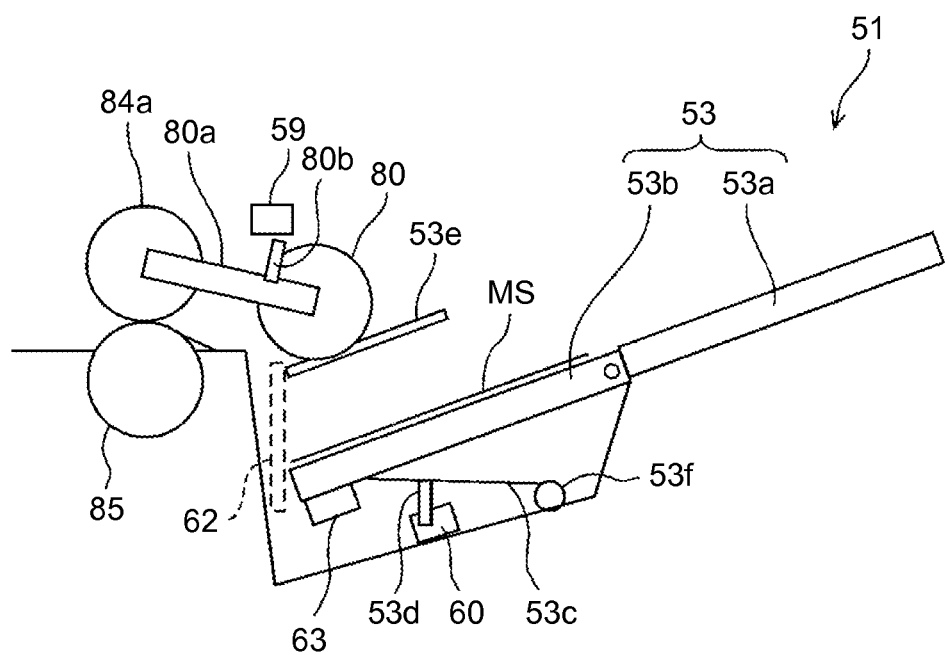
FIG. 1 is an enlarged explanatory view of the vicinity of a document loading plate in an ADF in a state where a movable document table has been lowered while an document is left thereon.
Figure 9:
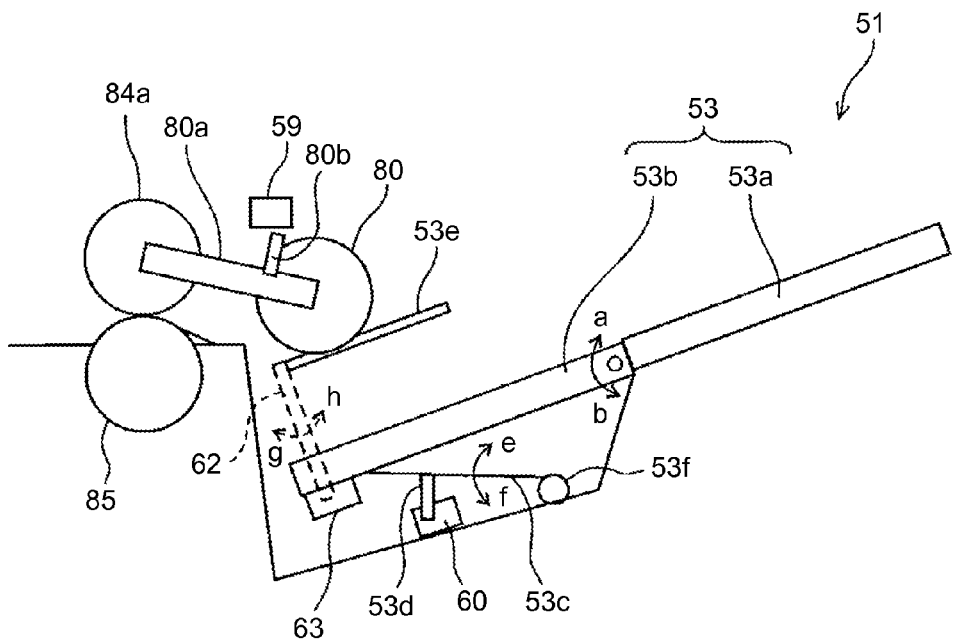
FIG. 9 is an enlarged explanatory view of the vicinity of a document loading plate in the ADF on standby.
Figure 10:
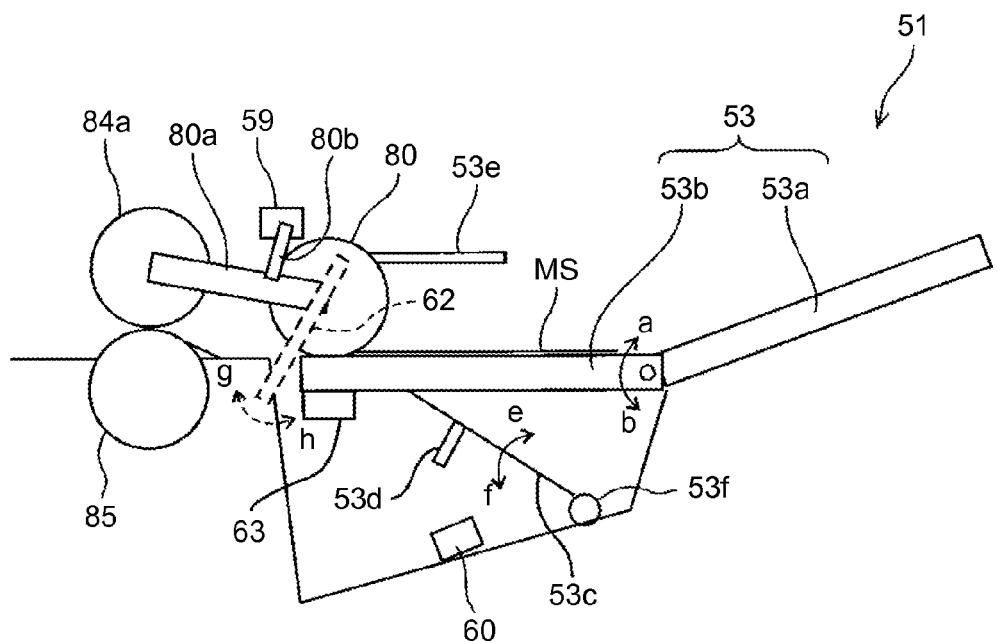
FIG. 10 is an enlarged explanatory view of the vicinity of the document loading plate in the ADF in a state where the placement of a document is complete.
Figure 11:
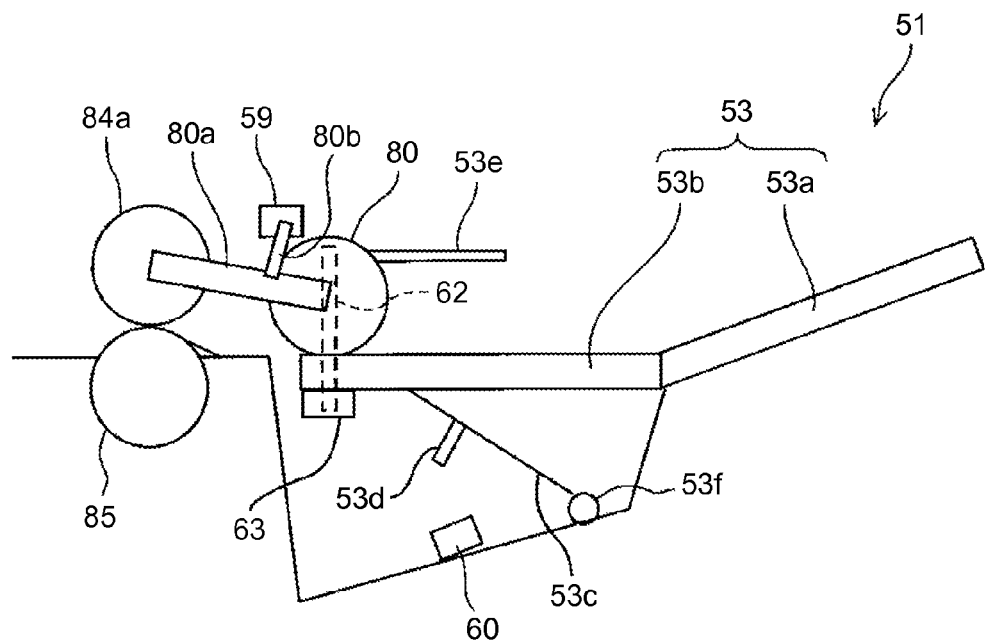
FIG. 11 is an enlarged explanatory view of the vicinity of the document loading plate in the ADF in a state where the document has been withdrawn while a nipping state is maintained.

FIG. 9 is an enlarged explanatory view of the vicinity of the document loading plate 53 in the ADF 51 before the document MS is placed. FIG. 1 is an enlarged explanatory view of the vicinity of the document loading plate 53 in the ADF 51 immediately after the user places the document MS or in the ADF 51 in a state where the movable document table 53b has been lowered while the document MS is left thereon, which is described below. Moreover, FIG. 10 is an enlarged explanatory view of the vicinity of the document loading plate 53 in the ADF 51 in a state where the placement of the document MS is complete. FIG. 11 is an enlarged explanatory view of the vicinity of the document loading plate 53 in the ADF 51 in a state where the document MS has been withdrawn while the nipping state is maintained.

The description has been given of the ADF 51 described using FIG. 6, regarding the configuration using the paper feeding belt 84 as a member forming the separation nip at a contact position with the reverse roller 85; however, the ADF 51 illustrated in FIGS. 1, 9, and 10 has a configuration using a paper feeding roller 84a. With regard to the control of the surface movement, similar control to the above-mentioned control of the surface movement of the paper feeding belt 84 is performed.

The ADF 51 includes a document set guide 53e that swings together with the movable document table 53b, above the movable document table 53b. The document set guide 53e is disposed with a predetermined space in between with the top surface of the movable document table 53b, and is a member that guides the document MS to below the pickup roller 80 of the ADF 51 before the document MS is placed, the ADF 51 being illustrated in FIG. 9. Moreover, the set feeler 62 is attached swingably in an arrows g-h direction in FIG. 9, centering around a swing shaft provided to the document set guide 53e. The document set sensor 63 is to detect the presence or absence of an end of the set feeler 62 at the detection position. The document set sensor 63 detects the absence of the set feeler 62 at the detection position; accordingly, it is possible to detect the placement of the document MS.

The table lift-up sensor 59 is disposed above the pickup roller 80. The table lift-up sensor 59 is a sensor that detects that the movable document table 53b has ascended too much, and detects that the top surface of a bundle of the documents MS is maintained at an appropriate height for paper feeding.

A base plate lift purpose lever 53c is disposed below the movable document table 53b, and swings in an arrows e-f direction in FIG. 9 by a base plate lift purpose rotation shaft 53f being driven and rotated by the drive of the base plate lift-up motor 105. At this point, the base plate lift purpose lever 53c rotates in the arrow e direction in FIG. 9; accordingly, it is possible to push up the movable document table 53b and rotate the movable document table 53b in the arrow a direction in the drawing. Moreover, a base plate descent state detection feeler 53d is disposed on the base plate lift purpose lever 53c, and a base plate home position sensor 60 detects the base plate descent state detection feeler 53d. Accordingly, it is possible to detect that the movable document table 53b is at a location of a home position being the lowest position as illustrated in FIG. 9.

FIG. 9 is an enlarged explanatory view of the ADF 51 in a state of waiting for the user placing a document, in other words, on standby. If the user places the document MS on the ADF 51 in the state illustrated in FIG. 9, the leading end of the document MS abuts on the set feeler 62. Accordingly, the set feeler 62 swings in the arrow g direction in FIG. 9 and reaches the state illustrated in FIG. 1. Consequently, the set feeler 62 deviates from the detection position of the document set sensor 63, and the document set sensor 63 detects the state where the set feeler 62 is not at the detection position. The detection result is input into the controller 100 via the main control unit 111; accordingly, the controller 100 detects that the document MS has been placed.

If detecting the placement of the document, the controller 100 drives the base plate lift-up motor 105 to rotate forward, rotates the base plate lift purpose lever 53c around the base plate lift purpose rotation shaft 53f, and pushes up the movable document table 53b. With the push-up, the movable document table 53b rotates in the arrow a direction in the drawing. The top surface of the loaded document MS ascends, and comes in contact with the pickup roller 80. The movable document table 53b is further pushed up afterwards; accordingly, the pickup roller 80 ascends together with the movable document table 53b. With the ascent, a pickup position detection feeler 80b provided to a pickup roller arm 80a that supports the pickup roller 80 reaches the detection position of the table lift-up sensor 59, and reaches the state illustrated in FIG. 10.

If the table lift-up sensor 59 reaches the state of FIG. 10 where the pickup position detection feeler 80b is detected, the controller 100 stops all the lift operations and transmits to the main control unit 111 a signal to convey the fact that the placement of the document MS is complete, and reaches a state of waiting for a print request. If the user presses the copy start button 158 to make a print request after the document MS is placed and the state of FIG. 10 is reached, the ADF 51 starts conveying the document MS, and the conveyed document MS is read by the scanner 150.

If the documents MS in the ADF 51 are repeatedly fed in a state where the table lift-up sensor 59 detects the pickup position detection feeler 80b, and stops the movable document table 53b from ascending, the position of the top surface of the documents MS is lowered, and the position of the pickup roller 80 is also lowered. Consequently, if the position of the pickup position detection feeler 80b deviates from the detection position of the table lift-up sensor 59 to change the detection state of the table lift-up sensor 59 to OFF, the controller 100 drives the base plate lift-up motor 105 again to rotate forward. If the detection state of the table lift-up sensor 59 is changed to ON, the drive of the base plate lift-up motor 105 is stopped. By repeating such control, the top surface position of the bundle of the documents MS is maintained at a height appropriate for paper feeding.

If all the placed documents MS are fed, there will be no document MS to abut on the set feeler 62. Therefore, the set feeler 62 rotates in the arrow h direction in FIG. 10, and reaches the detection position by the document set sensor 63. The detection state of the document set sensor 63 is changed to ON. The change in the detection state of the document set sensor 63 to ON is input into the controller 100 via the main control unit 111; accordingly, the controller 100 detects that the documents MS have disappeared from the document loading plate 53. Based on the detection, the controller 100 drives the base plate lift-up motor 105 to rotate reversely, and rotates the base plate lift purpose lever 53c in the arrow f direction in FIG. 10 around the base plate lift purpose rotation shaft 53f. Consequently, the movable document table 53b where the push-up is canceled rotates in the arrow b direction in FIG. 10, and its end (an end in the feed direction of the document MS) descends, and reaches the state illustrated in FIG. 9. At this point, the base plate home position sensor 60 detects the base plate descent state detection feeler 53d, and detects that the movable document table 53b is at the location of the home position.

The position of the movable document table 53b is moved to the home position; accordingly, the nipping state between the movable document table 53b and the pickup roller 80 is canceled, and it becomes possible to place a new bundle of the documents MS on the document loading plate 53.

In order to promote low power consumption, the copying machine 500 is set such that a shift is made to the energy saving mode in which power is stopped to be supplied to the image reading unit 50 including the ADF 51 if the drive command is not input for a predetermined time. Here, the drive command is an image formation request instruction to the copying machine 500 (such as pressing the copy start button 158 in a state where the document MS has been placed, and an image formation request from an external device such as a personal computer), the user's placing a document in the ADF 51, and the like.

Moreover, a shift is similarly made to the energy saving mode also if the user places a document, but does not subsequently make a print request by pressing the copy start button 158, and a predetermined time passes.

The document set sensor 63 included in the ADF 51 is configured to be possible to communicate with the main control unit 111 bypassing the controller 100 as illustrated in FIG. 7. Otherwise, also with respect to the supply of power to the document set sensor 63, it is configured to supply power through a path different from that of the other members of the ADF 51. Consequently, even if a shift is made to the energy saving mode, and the supply of power to the image reading unit 50 is stopped, the document set sensor 63 can perform detection, and the detection result can be used for the control of the main control unit 111.

It is desirable that conditions to return to the state where power is supplied to the image reading unit 50 from the state of the energy saving mode (hereinafter referred to as the "power restoration triggers") should be only when conditions where the performance of a copy operation is clearly predictable are satisfied.

Consequently, as the power restoration triggers of the copying machine 500 that has entered the energy saving mode, the following (1) to (7) are set:

(1) Operations on hard keys and touch keys on an operation panel (except a power supply key);

(2) At the time of a lift-up operation: at the time of open and close operations on the scanner 150 of the ADF 51 illustrated in FIG. 5;

(3) Document placement operation on the ADF 51: detection of a change in the detection result of the document set sensor 63 from ON to OFF;

(4) At the time of placing a transfer paper on a bypass tray 250: when an unillustrated sensor detects that the state has changed from paper absent to paper present on the bypass tray 250.

(5) When the transfer paper cassette 42 of the transfer paper supplying device 40 is drawn out;

(6) A restoration request from an external device: at the time of using an operating unit such as a TWAIN scanner; and (7) At the time of opening an outer cover: when an unillustrated sensor detects that the outer cover (a cover to be opened when a jammed paper is removed, such as the paper feeding unit cover 145 and an outer cover of the main body of the device) that was in a closed state has been changed to an open state.

As in the power restoration triggers of the above (1) to (7), when a condition where an execution command of a copy operation is predicted next is satisfied, power is restored. Consequently, the user can perform a copy operation by performing a copy execution command (pressing the copy start button 158) without performing a specific operation for power restoration separately after any of the power restoration trigger conditions is satisfied.

As described above, the copying machine 500 shifts to the energy saving mode also if the user places a document in the ADF 51, but does not subsequently make a print request by pressing the copy start button 158, and a predetermined time passes. At this point, as illustrated in FIG. 10, when a shift is made to the energy saving mode while a state where the pickup roller 80 continues to be in contact with the document MS on the document loading plate 53, in other words, the nipping state of the movable document table 53b and the pickup roller 80 is maintained, even if the document MS on the document loading plate 53 is withdrawn, the energy saving mode continues while the nipping state is maintained as illustrated in FIG. 11.

If the document MS on the document loading plate 53 is withdrawn at a timing before a shift is made to the energy saving mode (if the state of FIG. 10 is changed to the state of FIG. 11), since power is supplied to the ADF 51, control is performed such that the state of FIG. 11 is changed to the state of FIG. 9 similarly to the case where all the placed documents MS are fed.

There are the following two conceivable patterns, (a) and (b), as the user's actions after the document MS that was placed on the document loading plate 53 before the energy saving mode is withdrawn in energy saving mode:

(a) After the document MS is withdrawn from the document loading plate 53, the withdrawn document MS is placed again on the document loading plate 53 and is copied.

(b) After the document MS is withdrawn from the document loading plate 53, a copy is not performed, and the document MS is taken back.

In the above case (b), when the document MS on the document loading plate 53 is withdrawn, and the energy saving mode continues while the nipping state is maintained, even if an attempt is made to place the withdrawn document MS again on the document loading plate 53, there is no space between the movable document table 53b and the pickup roller 80 with the nipping state maintained. Therefore, it is not possible to place the document MS again. If the document MS cannot be placed again, it is not possible to use the power restoration trigger of the above (3). Therefore, it is necessary for the user to execute the power restoration trigger other than the above (3) to cancel the energy saving mode.

In such a case, a user who is used to the copy operation of simply pressing the copy start button 158 after performing the document placement operation on the ADF 51 may become at a loss about the fact that he/she cannot place the document MS again, and suspect a trouble.

Moreover, there are the following problems also for a user who understands to execute another power restoration trigger when he/she cannot place the document MS again. In other words, if another power restoration trigger is executed on the copying machine 500 that has entered the energy saving mode while in the nipping state, and the energy saving mode is cancelled, it is necessary in the ADF 51 where the energy saving mode is cancelled and power is supplied thereto to place the document MS after waiting for the cancellation of the nipping state based on the detection of the absence of a document by the document set sensor 63, and press the copy start button 158. Consequently, for the user who is used to simple operations of placing the document MS and pressing the copy start button 158 to enable the start of feeding the document MS, operability is decreased due to the use of another power restoration trigger, and usability becomes worse due to the extended time necessary after the placement of the document.

Moreover, also in the case of the above (b), a new document MS cannot be placed in the nipping state; accordingly, similar problems to the case of the above (a) may arise.

In the embodiment, as a configuration of a sheet nipping unit that causes the nipping state, included is a configuration of nipping the document MS between the movable document table 53b and the pickup roller 80 by raising the movable document table 53b being a movable base plate as well as lowering the pickup roller 80. The configuration of the sheet nipping unit is not limited to the configuration of moving both of the pickup roller and the base plate. Even with a configuration where, as in a configuration where only the pickup roller is moved and a configuration where only the movable base plate is moved, either of them is moved, as long as it is a configuration where the nipping state is caused if the placement of a document is detected, similar problems may arise.

A description will hereinafter be given of a characterized part of the ADF 51 of the embodiment, which can solve the above problems.

The ADF 51 of the embodiment is configured to perform control such that the nipping state of the movable document table 53b and the pickup roller 80 is cancelled before the energy saving mode is executed by the control of the main control unit 111 and the controller 100.

Figure 12:
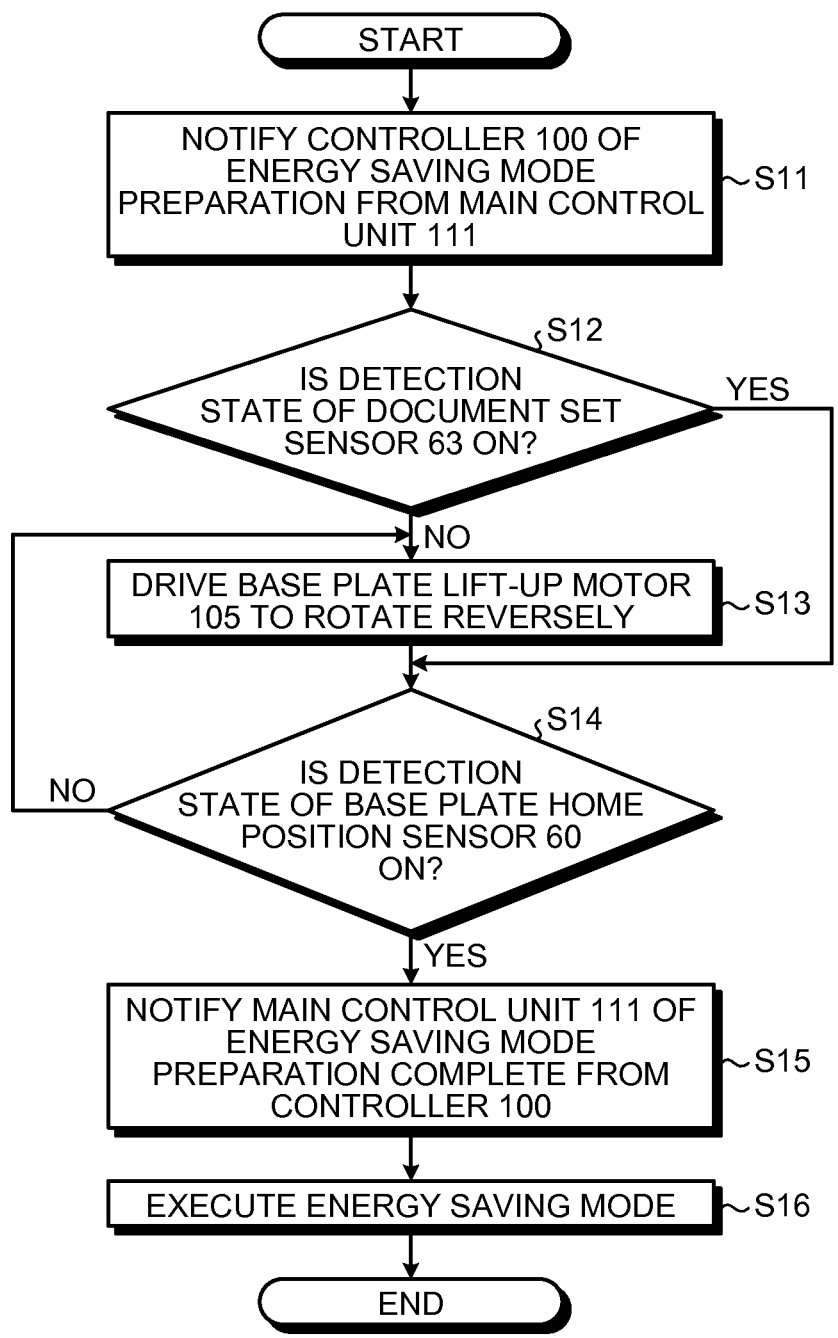
FIG. 12 is a flowchart of control to shift to the energy saving mode to be executed if a drive command is not input for a predetermined time in the copying machine of the embodiment.

FIG. 12 is a flowchart of control to shift to the energy saving mode to be executed if a drive command is not input for a predetermined time in the copying machine 500 of the embodiment.

In the copying machine 500, if a drive command is not input for a predetermined time, a preparation notification to shift to the energy saving mode is given from the main control unit 111 to the controller 100 (S11). The controller 100, into which the preparation notification has been input, acquires information on the detection state of the document set sensor 63 via the main control unit 111 (S12). Here, the case where the detection state of the document set sensor 63 is ON (Yes in S12) is the state illustrated in FIG. 9 where the set feeler 62 is positioned at the detection position of the document set sensor 63, there is no document MS on the document loading plate 53, and the movable document table 53b is down. In this case, information on the detection state of the base plate home position sensor 60 is acquired (S14).

On the other hand, a case where the detection state of the document set sensor 63 is OFF (No in S12) is a state illustrated in FIG. 10 where the set feeler 62 is not positioned at the detection position of the document set sensor 63, there is the document MS on the document loading plate 53 since the document MS abuts on the set feeler 62 at this point, and the movable document table 53b is up. In this case, the base plate lift-up motor 105 is driven and rotated reversely (S13). The movable document table 53b is lowered to the home position while the state where the document MS abuts on the set feeler 62 is maintained, and the state is changed to the one illustrated in FIG. 1. Information on the detection state of the base plate home position sensor 60 is subsequently acquired (S14).

If the detection state of the base plate home position sensor 60 is ON (Yes in S14), an energy saving mode preparation complete notification is given from the controller 100 to the main control unit 111 (S15). The main control unit 111 executes the energy saving mode (S16), and stops the supply of power to the ADF 51.

On the other hand, if the detection state of the base plate home position sensor 60 is OFF (No in S14), the base plate lift-up motor 105 is driven and rotated reversely until the detection state of the base plate home position sensor 60 is changed to ON (S13). Here, when the detection state of the base plate home position sensor 60 is not changed to ON even if the reverse rotation drive is performed for a previously fixed time, an error notification is given from the controller 100 to the main control unit 111, and an error is displayed on an unillustrated display unit.

In this manner, it is configured such that, before the copying machine 500 shifts to the energy saving mode, the ADF 51 is communicated to confirm the state of the ADF 51 to check whether it is in the state of waiting for a document to be placed as a document is absent on the movable document table 53b, or in the state of stopping to wait for the above described print request, and the results are returned in communication.

The copying machine 500 that has shifted to the energy saving mode by the flow illustrated in FIG. 12 enters the energy saving mode after the cancellation of the nipping state. Accordingly, if a predetermined time passes while the document MS is left on the document loading plate 53, the energy saving mode starts after the nipping state for the document MS is cancelled. At this point, if the document MS is withdrawn from the document loading plate 53, the document MS disappears from the document loading plate 53 in the state where the nipping state has been cancelled. Accordingly, when a new document MS is placed on the document loading plate 53 next, it becomes possible to place the document MS without the pickup roller 80 and the movable document table 53b hindering the placement. Consequently, even if the energy saving mode starts while the document MS is left on the document loading plate 53, it is possible to use the power restoration trigger of the above (3), and the user can cancel the energy saving mode simply by placing the document MS on the document loading plate 53.

In this manner, in the ADF 51, even if the energy saving mode starts while the document MS is left on the document loading plate 53, it is possible to use all the power restoration triggers including the power restoration trigger of the above (3). The energy saving mode is cancelled simply by the user's placement on the document loading plate 53. Accordingly, it is possible to maintain excellent user usability.

The copying machine 500 of the embodiment is configured to, in the state of the energy saving mode, stop the supply of power to the controller 100 being a control unit that controls the operations of the electric members of the ADF 51, but may be configured to, in energy saving mode, continue the supply of power to the controller 100 and stop the supply of power to the other electric members.

[Modification]

Next, a description will be given of a modification of the copying machine 500 to which the characterised part of the present invention is applied.

In the above-mentioned embodiment, the description has been given of the configuration where if a drive command is not input for a predetermined time, a preparation notification to shift to the energy saving mode is given from the main control unit 111 to the controller 100. However, in the modification, it is configured such that either the setting to give the preparation notification or the setting not to give the preparation notification can be preset according to user preference. The modification is different only in control until a shift is made to the energy saving mode, and the configuration of the mechanism of the copying machine 500 is similar to that of the above-mentioned embodiment.

The copying machine 500 of the modification includes the document set sensor 63 that is disposed in the vicinity of the document loading plate 53, and can detect the presence or absence of a document on the document loading plate 53 even after a shift is made to the energy saving mode, similarly to the above-mentioned embodiment.

It is configured such that either of the following settings α and β can be selected to be set as the user setting that can be preset according to user preference.

Setting α: a setting to, upon shifting to the energy saving mode, perform control to shift to the energy saving mode after the main control unit 111 communicates with the controller 100 to check the state of the ADF 51 and move the position of the movable document table 53b to the home position.

Setting β: a setting to, upon shifting to the energy saving mode, perform control to shift to the energy saving mode without the main control unit 111 communicating with the controller 100.

Moreover, it is configured such that if the setting β is selected, either of the following settings β1 and β2 can be selected to be set.

Setting β1: a setting to perform control to move the position of the movable document table 53b to the home position if the detection state of the document set sensor 63 is changed from ON to OFF in energy saving mode.

Setting β2: a setting not to perform new control even if the detection state of the document set sensor 63 is changed from ON to OFF in energy saving mode.

In this manner, in the copying machine 500 of the modification, the setting of control related to the energy saving mode can be set according to user preference; accordingly, it is possible to improve user convenience.

Figure 13:
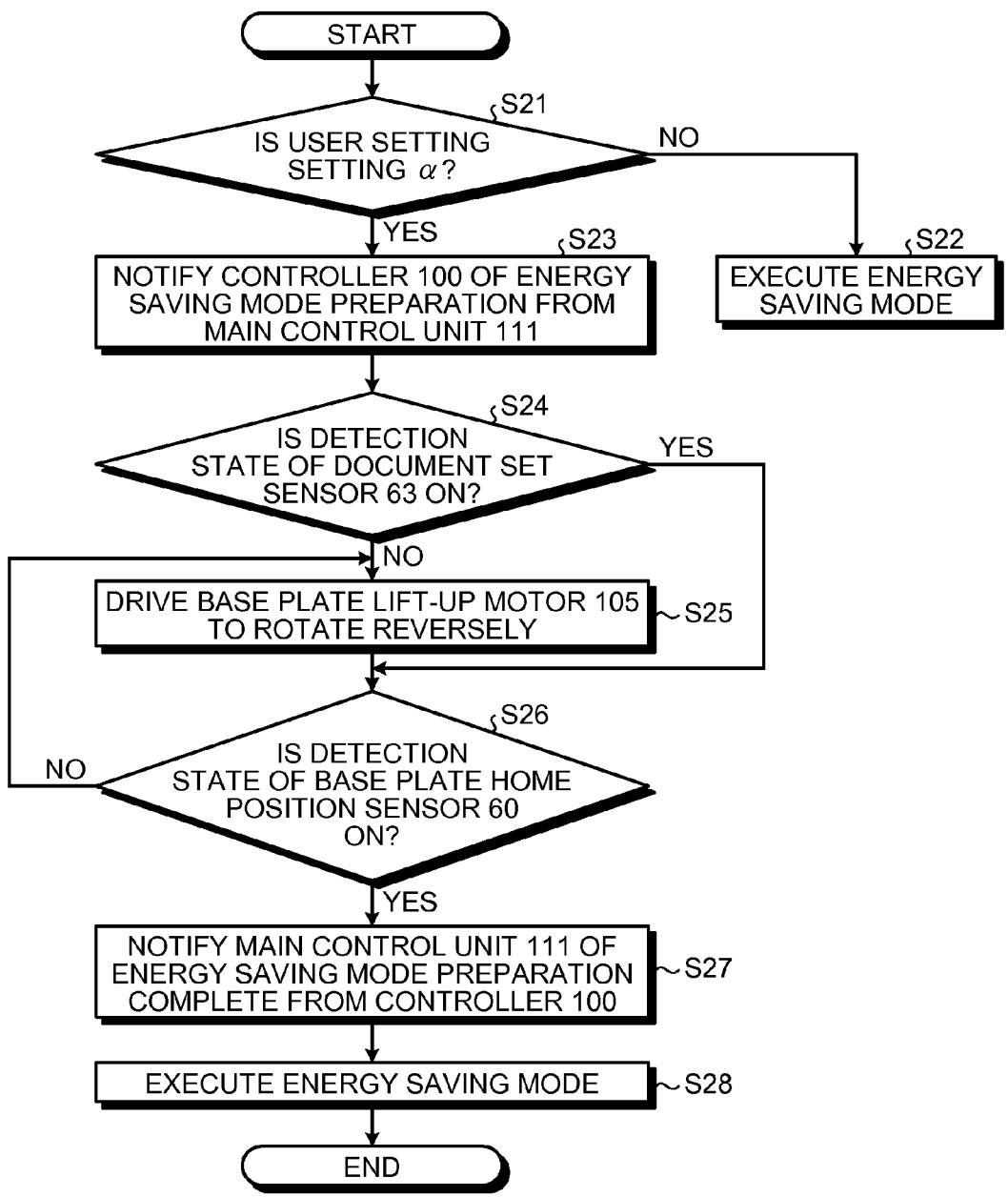
FIG. 13 is a flowchart of control to shift to the energy saving mode to be executed if a drive command is not input for a predetermined time in a copying machine of a modification.

FIG. 13 is a flowchart of control to shift to the energy saving mode to be executed if a drive command is not input for a predetermined time in the copying machine 500 of the modification.

In the copying machine 500 of the modification, if a drive command is not input for a predetermined time, the main control unit 111 checks whether the user setting is the setting α or the setting β (S21). If the user setting is the setting α (Yes in S22), similar control to that of the copying machine 500 of the above-mentioned embodiment is performed.

In other words, a preparation notification to shift to the energy saving mode is given from the main control unit 111 to the controller 100 (S23). The controller 100 acquires information on the detection state of the document set sensor 63 (S24). Here, if the detection state of the document set sensor 63 is ON (Yes in S24), information on the detection state of the base plate home position sensor 60 is acquired (S26). If the detection state of the document set sensor 63 is OFF (No in S24), the base plate lift-up motor 105 is driven and rotated reversely (S25). Information on the detection state of the base plate home position sensor 60 is subsequently acquired (S26).

If the detection state of the base plate home position sensor 60 is ON (Yes in S26), an energy saving mode preparation complete notification is given from the controller 100 to the main control unit 111 (S27). The main control unit 111 executes the energy saving mode (S28), and stops the supply of power to the ADF 51.

If the detection state of the base plate home position sensor 60 is OFF (No in S14), the base plate lift-up motor 105 is repeatedly driven and rotated reversely (S25). When the detection state of the base plate home position sensor 60 is not changed to ON even if the reverse rotation drive is performed for a previously fixed time, an error is displayed on an unillustrated display unit.

In the case of the setting α in the copying machine 500 of the modification, similarly to the copying machine 500 of the embodiment, if a predetermined time passes while the document MS is left on the document loading plate 53, the energy saving mode starts after the cancellation of the nipping state for the document MS is made as illustrated in FIG. 1. Therefore, even if the energy saving mode starts while the document MS is left on the document loading plate 53, it is possible to use the power restoration trigger of the above (3), and the user can cancel the energy saving mode simply by placing the document MS on the document loading plate 53.

On the other hand, if the user setting is the setting β (NO in S22), the main control unit 111 does not communicate with the controller 100, executes the energy saving mode (S28), and stops the supply of power to the ADF 51. In this manner, in the case of the setting β, the main control unit 111 does not communicate with the controller 100; accordingly, a shift is made to the energy saving mode regardless of the state of the ADF 51.

Consequently, if a predetermined time passes in the state where the document MS is left on the document loading plate 53 in the copying machine 500 where the setting β has been selected, a shift is made to the energy saving mode in the state where the document MS keeps to be nipped by the movable document table 53b and the pickup roller 80, as illustrated in FIG. 10.

In the copying machine 500 where the setting β has been selected, control when the document MS is withdrawn after the energy saving mode starts in the state where the document MS is left on the document loading plate 53 is different between the case of the setting β1 and the case of the setting β2.

FIG. 14 is a flowchart of control of when the document MS is withdrawn during the energy saving mode after the setting β is selected as the user setting, and the energy saving mode starts in the state where the document MS is left on the document loading plate 53, in the copying machine 500 of the modification.

If the energy saving mode (S31) starts in the state where the placement on the document loading plate 53 is continued, the document MS is in a state of abutting on the set feeler 62; accordingly, the detection state of the document set sensor 63 is OFF.

If the document MS is withdrawn from the document loading plate 53 upon such an occasion during the energy saving mode (S31), the abutment of the document MS is cancelled, the set feeler 62 reaches the detection position of the document set sensor 63, and the main control unit 111 detects that the detection state of the document set sensor 63 is changed from OFF to ON (S32).

The main control unit 111, which has detected that the detection state of the document set sensor 63 was changed from OFF to ON, checks whether the user setting is the setting β1 or β2 (S21). If the user setting is the setting β2 (No in S33), new control is not performed. Even if there is no more document MS on the document loading plate 53, the nipping state is maintained as illustrated in FIG. 11, and the energy saving mode is continued (S34). In this manner, in the setting β2, even if there is no document MS on the document loading plate 53, the energy saving mode may be continued while the nipping state is maintained. In such a case, since the document MS cannot be placed again, it is not possible to use the power restoration trigger of the above (3), and it is necessary for the user to execute the power restoration trigger other than the above (3) to cancel the energy saving mode.

On the other hand, if the user setting is the setting β1 (Yes in S33), the main control unit 111 resumes the supply of power to the ADF 51, and cancels the energy saving mode (S35). The controller 100, the supply of power to which has been resumed, subsequently acquires information on the detection states of the document set sensor 63 and the base plate home position sensor 60, and detects that the detection state of the document set sensor 63 is ON, and the detection state of the base plate home position sensor 60 is OFF. In the case of such detection results, the movable document table 53b maintains the raised state (the state illustrated in FIG. 11) regardless of the fact that the document MS is not placed on the document loading plate 53. Hence, the controller 100 drives the base plate lift-up motor 105 to rotate reversely (S36), lowers the movable document table 53b to the home position to reach the state illustrated in FIG. 9, and subsequently acquires information on the detection state of the base plate home position sensor 60 (S37).

If the detection state of the base plate home position sensor 60 is ON (Yes in S37), a base plate descent complete notification is given from the controller 100 to the main control unit 111. The main control unit 111 resumes the energy saving mode (S38), and stops the supply of power to the ADF 51.

In this manner, in the case of the setting β1 in the copying machine 500 of the modification, if a predetermined time passes in the state where the document MS is left on the document loading plate 53, the energy saving mode starts while the nipping state is maintained, as illustrated in FIG. 10. However, if the document MS is withdrawn, the energy saving mode is resumed after the movable document table 53b is lowered to the home position. Accordingly, when the document MS is placed again, it is possible to use the power restoration trigger of the above (3), and the user can cancel the energy saving mode simply by placing the document MS on the document loading plate 53.

The timing to resume the energy saving mode after the movable document table 53b is lowered to the home position is immediately after the detection state of the base plate home position sensor 60 is changed to ON. Consequently, although it is configured such that the energy saving mode is cancelled, power supplied to the ADF 51 is kept to a minimum, and an increase in power consumption can be suppresses.

A setting to set the timing to resume the energy saving mode to a timing after a lapse of a predetermined time after the detection state of the base plate home position sensor 60 is changed to ON, according to user preference may be provided.

In the case of the setting where the energy saving mode is resumed immediately after the detection state of the base plate home position sensor 60 is changed to ON, it takes time to withdraw the document MS after the energy saving mode starts, and initiates the next copy immediately. Specifically, if the document MS is withdrawn in the state of the energy saving mode, the movable document table 53b descends, and reaches the home position. The energy saving mode is then resumed immediately. At this point, even if the document MS is withdrawn and the document MS is immediately placed again, a shift is once made to the energy saving mode, and the energy saving mode is subsequently cancelled based on the power restoration trigger of the above (3). The movable document table 53b is raised based on the subsequent detection result that the document MS has been placed, and the state of waiting for a print request is reached. In this manner, when it is desired to perform a copy operation immediately, if the control to shift to the energy saving mode and the cancellation control are performed, it takes time. Furthermore, the control to shift to the energy saving mode once in spite of that a copy is immediately initiated is useless control.

On the other hand, in the case of the setting to resume the energy saving mode after a lapse of a predetermined time after the detection state of the base plate home position sensor 60 is changed to ON, if the document MS is withdrawn and the document MS is immediately placed again, the placement of the document MS on the movable document table 53b, which has descended due to the withdrawal, is detected before a shift is made to the energy saving mode. The movable document table 53b is raised based on the detection result and the state of waiting for a print request is reached. With the setting, when it is desired to perform a copy operation immediately after the document MS is withdrawn, the control to shift to and cancel the energy saving mode is not performed. Accordingly, it is possible to shorten the time from the withdrawal of the document MS to the performance of the next copy operation.

In the copying machine 500 of the modification, compared with the setting β2, the setting α can use the power restoration trigger of the above (3) when the document MS is placed again. There is an advantage that the user can cancel the energy saving mode simply by placing the document MS on the document loading plate 53.

Moreover, compared with the setting β1, the setting α causes a shift to the energy saving mode after the cancelation of the nipping state if a predetermined time passes in a state where the document MS is left on the document loading plate 53. Accordingly, even if the document MS is withdrawn after the shift is made to the energy saving mode, the control to cancel the energy saving mode is not performed. Therefore, there are advantages that the energy saving mode is not cancelled only for the withdrawal of the document MS, and it is possible to suppress power consumption after the energy saving mode starts.

Compared with the setting α, when a shift is made to the energy saving mode, the main control unit 111 does not communicate with the controller 100, and a shift is made to the energy saving mode whatever the state the ADF 51 is in; accordingly, the setting β1 can shorten the time from after a lapse of a predetermined time to the shift to the energy saving mode. There are advantages that it is possible to reduce the amount of power supplied to the ADF 51 by the amount corresponding to the shortened time, and it is possible to suppress power consumption upon shifting to the energy saving mode.

Moreover, compared with the setting β2, the setting β1 can use the power restoration trigger of the above (3) when the document MS is placed again. There is an advantage that the user can cancel the energy saving mode simply by placing the document MS on the document loading plate 53 after withdrawing the document MS.

Compared with the setting α, when a shift is made to the energy saving mode, the main control unit 111 does not communicate with the controller 100, and a shift is made to the energy saving mode whatever the state the ADF 51 is in; accordingly, the setting β2 can shorten the time from after a lapse of a predetermined time to the shift to the energy saving mode. There are advantages that it is possible to reduce the amount of power to be supplied to the ADF 51 by the amount corresponding to the shortened time, and it is possible to suppress power consumption upon shifting to the energy saving mode.

Moreover, compared with the setting β1, even if the document MS is withdrawn after a shift is made to the energy saving mode, the setting β2 does not perform the control to cancel the energy saving mode. Accordingly, there are advantages that the energy saving mode is not cancelled only for the withdrawal of the document MS, and it is possible to suppress power consumption after the energy saving mode starts.

In other words, the setting β1 is a setting suitable to users who desire to minimize power consumption.

In this manner, the settings α, β1, and β2 have advantages compared with the other settings, respectively. Accordingly, the user performs the user setting in accordance with their respective advantages, which makes it possible to realize the copying machine 500 that can perform control according to user preference.

In the copying machine 500 where the setting β of the modification has been selected, the power restoration trigger other than the above (3), such as lift-up, may be executed before the document MS is withdrawn, in a state where the energy saving mode starts in a state where the document MS continues to be nipped, as illustrated in FIG. 10.

The copying machine 500 of the modification has a configuration where it is possible to select and set any of the following settings γ1 and γ2 as control in this case.

Setting γ1: a setting to lower the movable document table 53b if the power restoration trigger is executed in a state where the energy saving mode starts in a state where the document MS continues to be nipped.

Setting γ2: a setting not to lower the movable document table 53b even if the power restoration trigger is executed in a state where the energy saving mode starts in a state where the document MS continues to be nipped.

In the case of the setting γ1, if the movable document table 53b descends when the supply of power is resumed by the execution of the power restoration trigger other than the above (3), and a predetermined time passes again without the document MS being subsequently fed, the energy saving mode starts in a state where the movable document table 53b is down. Consequently, even if the setting β is selected and the energy saving mode starts in the state where the document MS continues to be nipped, the movable document table 53b is lowered in accordance with the time when the supply of power is resumed by another power restoration trigger. Accordingly, it is unnecessary to supply power to the ADF 51 only to lower the movable document table 53b. Hence, it is possible to suppress power consumption, and use the power restoration trigger of the above (3) after the supply of power is resumed once by another power restoration trigger, and the user can cancel the energy saving mode simply by placing the document MS on the document loading plate 53.

In the case of the setting γ2, even if the power restoration trigger other than the above (3) is executed to resume the supply of power, the movable document table 53b does not descend, and the nipping state is maintained. Especially, at the time of the lift-up operation of the above (2) among the power restoration triggers other than the above (3), the open and close operations are performed on the ADF 51. Accordingly, the fall of the document MS or the skew of the document MS may occur unless the document MS on the document loading plate 53 is held down. Moreover, in the case of another power restoration trigger, the fall of the document MS or the skew of the document MS may occur by an impact being transferred to the document loading plate 53.

In contrast, in the case of the setting γ2, when the power restoration trigger other than the above (3) is executed to resume the supply of power, the nipping state is maintained, and the document MS on the document loading plate 53 is in the state of being held down. Accordingly, it is possible to suppress the occurrence of the fall and skew of the document MS.

Furthermore, in the case of the setting γ2, when the power restoration trigger other than the above (3) is executed to resume the supply of power, the document MS is in the nipped state, and the state of waiting for a print request is reached. Consequently, after the supply of power is resumed, it is possible to start feeding the document MS immediately when the copy start button 158 of the operating unit 108 is pressed.

The copying machine 500 where the setting β2 of the modification has been selected may enter the energy saving mode in the state where the document MS continues to be nipped, and the power restoration trigger other than the above (3), such as lift-up, may be executed after the document MS is withdrawn. In this case, the movable document table 53b is controlled to be lowered. Consequently, it is possible to lower the movable document table 53b in accordance with the time when the supply of power is resumed by another power restoration trigger. In such a setting, it is possible to suppress power consumption, and use the power restoration trigger of the above (3) after the supply of power is resumed once by another power restoration trigger, and the user can cancel the energy saving mode simply by placing the document MS on the document loading plate 53.

In the copying machine 500 of the modification, it is possible to select, as the user setting, the control condition between the setting β where the main control unit 111 does not communicate with the controller 100 before a shift is made to the energy saving mode, and a shift is made to the energy saving mode in the state of FIG. 9 or FIG. 10, and the setting α where the main control unit 111 communicates with the controller 100 before a shift is made to the energy saving mode, and a shift is made to the energy saving mode while in the state of FIG. 9, or after a shift operation from the state of FIG. 10 to the state of FIG. 1.

It is possible to select the control condition before a shift is made to the energy saving mode; accordingly, it is possible to reduce power consumption in the case of the setting β, and it becomes possible to shorten the time necessary for an image reading operation after a return from the energy saving mode in the case of the setting α.

Those described above are examples, and the present invention takes specific effect according to each of the following aspects.

(Aspect A)

A sheet conveying device, such as the ADF 51, includes: a sheet housing unit, such as the document loading plate 53, that houses a sheet such as the document MS; a sheet conveying unit, such as the pair of pull-out rollers 86, the pair of intermediate rollers 66, and the pair of scanning entrance rollers 90, that conveys the sheet to a predetermined conveyance destination position; a sheet detection unit, such as the document set sensor 63, that detects the presence or absence of the sheet in the sheet housing unit; a sheet nipping unit, such as the pickup roller 80, the movable document table 53b, and the base plate lift-up motor 105, that nips the sheet housed in the sheet housing unit; a sheet sending unit, such as the pickup roller 80, that applies a conveying force toward the sheet conveying unit to the sheet nipped by the sheet nipping unit, and sends out the sheet; and a control unit, such as the controller 100 and the main control unit 111, that controls the drive of electric mechanisms in accordance with a drive command to be input. The control unit is to control the sheet nipping unit to reach the nipping state to nip the sheet in the sheet housing unit when the sheet detection unit detects a sheet-present state, and performing control to cancel the nipping state upon detection of the absence of the sheet in the sheet housing unit. The control unit executes a power saving mode, such as an energy saving mode, to stop supplying power to at least a part (such as the entire ADF 51 other than the document set sensor 63) of the electric mechanisms requiring to be supplied with power when driven, other than the sheet detection unit, if the drive command is not input for a predetermined time. A cancellation condition to cancel the power saving mode if the detection state of the sheet in the sheet housing unit by the sheet detection unit is changed from absent to present during the power saving mode is set. In the sheet conveying device, the control unit such as the controller 100 and the main control unit 111 controls the sheet nipping unit to cancel the nipping state before execution of the power saving mode. According to this, as described in the above embodiment, the power saving mode starts after the nipping state is cancelled; accordingly, if a predetermined time passes in a state where the sheet is left housed in the sheet housing unit, the power saving mode starts after the cancellation of the nipping state of the sheet. At this point, if the sheet is withdrawn from the sheet housing unit, the sheet disappears from the sheet housing unit in the state where the nipping state has been cancelled. Accordingly, when the next new sheet is placed in the sheet housing unit, it becomes possible to place the sheet without the sheet nipping unit hindering the placement. A new sheet is placed without the sheet nipping unit hindering the placement. Accordingly, it is possible to change the detection state of a sheet in the sheet housing unit by the sheet detection unit from absent to present. The change of the detection state is set as a power-saving cancellation condition. Hence, even if a shift is made to the power saving mode in the state where the sheet is left housed in the sheet housing unit, and the housed sheet is subsequently withdrawn, the user can cancel the power saving mode simply by placing the sheet in the sheet housing unit.

(Aspect B)

In (Aspect A), the sheet housing unit is a sheet loading unit, such as the document loading plate 53, that houses the sheet by loading the sheet on a loading surface thereof, and the sheet nipping unit includes a loading unit lift unit, such as a base plate lift-up motor 105, that raises and lowers at least a part (such as the movable document table 53b) of the sheet loading unit, and a sheet top nipping member, such as the pickup roller 80, that nips the sheet such as the document MS with the sheet loading unit. The loading unit lift unit raises the sheet loading unit to narrow a distance between the sheet loading unit and the sheet top nipping member, and have the nipping state. The loading unit lift unit lowers the sheet loading unit to widen the distance between the sheet loading unit and the sheet top nipping member, and cancel the nipping state. According to this, as described in the above embodiment, it is possible to realize the sheet nipping unit that nips the sheet loaded on the sheet loading unit. In the above-mentioned embodiment, the sheet top nipping member is the pickup roller 80, and the pickup roller 80 is configured to serve as both of the sheet top nipping member and the sheet sending unit.

(Aspect C)

In the aspect of (Aspect A) or (Aspect B), it is possible to select a user setting where a setting can be selected during use, between a nip cancellation priority setting, such as the setting α, to control the sheet nipping unit, such as the base plate lift-up motor 105, to cancel the nipping state before the control unit such as the controller 100 and the main control unit 111 executes the power saving mode such as the energy saving mode if a drive command is not input for a predetermined time, and a power-saving priority setting, such as the setting β, to execute the power saving mode without the control unit performing control to cancel the nipping state if a drive command is not input for a predetermined time. According to this, as described in the modification, the setting of control related to the power saving mode can be set according to user preference; accordingly, it is possible to improve user convenience.

(Aspect D)

In (Aspect C), it is possible to select a further user setting in a state of the power-saving priority setting such as the setting β between a sheet removal occasion power-saving cancellation setting, such as the setting β1, to cancel the power saving mode if the detection state of the sheet such as the document MS in the sheet housing unit such as the document loading plate 53 by the sheet detection unit such as the document set sensor 63 is changed from present to absent, during the power saving mode such as the energy saving mode, and a sheet removal occasion power-saving continuation setting, such as the setting β2, not to cancel the power saving mode regardless of a change in the detection state from present to absent. According to this, in the setting where power saving takes priority upon shifting to the power saving mode, it is possible to select between the setting that ensures convenience to some extent as in the sheet removal occasion power-saving cancellation setting, and the setting where further power saving takes priority as in the sheet removal occasion power-saving continuation setting. Accordingly, it is possible to further improve user convenience.

(Aspect E)

An image reading device, such as the image reading unit 50, includes: a document conveying unit that conveys a document sheet such as the document MS as a sheet; and a conveyed document reading unit, such as the scanner 150, that reads the document image of a document sheet conveyed by the document conveying unit, in which the sheet conveying device according to any one of (Aspect A) to (Aspect D), such as the ADF 51, is used as the document conveying unit. According to this, as described in the above embodiment, it is possible to maintain excellent user usability in the sheet conveying device; accordingly, it is possible to realize the image reading device that makes it easy for the user to perform an image reading operation.

(Aspect F)

In Aspect E, included are: a static document reading unit, such as the moving reading unit 152 and the image reading sensor 153, that reads the document image of a document sheet such as the document MS in a static state of being placed by the user at a predetermined fixed position such as the second exposure glass 155; and an open/close member, such as the ADF 51, that exposes the fixed position by being opened and puts the document sheet in a placeable state. If the open/close member is opened while the sheet conveying device such as the ADF 51 is executing the power saving mode such as the energy saving mode, the power saving mode is cancelled. According to this, as described in the above modification, the open/close member is opened when a power-saving cancellation operation of placing the sheet in the sheet housing unit cannot be performed; accordingly, it is possible to cancel the power saving mode.

(Aspect G)

An image forming device, such as the copying machine 500, including: an image reading unit; and an image forming unit, such as the image forming unit 1, that forms an image based on a document image read by the image reading unit, includes the image reading device according to Aspect E or F as the image reading unit. According to this, as described in the above embodiment, the user can perform an image reading operation easily; accordingly, it is possible to realize an image forming device that the user can perform a copy operation easily.

In the embodiment, after the nipping state is cancelled, the power saving mode starts; accordingly, even if a predetermined time passes in a state where a sheet is left housed in the sheet housing unit, and the power saving mode starts, the nipping state of the sheet is cancelled. At this point, if the sheet is withdrawn from the sheet housing unit, the sheet disappears from the sheet housing unit in the state where the nipping state has been cancelled. Accordingly, when the next new sheet is placed in the sheet housing unit, it becomes possible to place the sheet without a sheet nipping unit hindering the placement. The new sheet is placed without the sheet nipping unit hindering the placement. Accordingly, it is possible to change the detection state of a sheet in the sheet housing unit by the sheet detection unit from absent to present. The change of the detection state is set as the power-saving cancellation condition. Therefore, even if a shift is made to the power saving mode in the state where a sheet is left housed in the sheet housing unit, and then the housed sheet is withdrawn, a user can cancel the power saving mode simply by placing a sheet in the sheet housing unit.

The embodiment provides an excellent effect that the power saving mode can be canceled simply by placing a new sheet in the sheet housing unit if a shift is made to the power saving mode in a state where a sheet is left housed in the sheet housing unit, and then the housed sheet is withdrawn.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A sheet conveying device comprising:
    a sheet housing unit that houses a sheet;
    a sheet conveying unit that conveys the sheet to a predetermined conveyance destination position;
    a sheet detection unit that detects presence or absence of the sheet in the sheet housing unit;
    a sheet nipping unit that nips the sheet housed in the sheet housing unit;
    a sheet sending unit that applies a conveying force toward the sheet conveying unit to the sheet nipped by the sheet nipping unit and sends out the sheet; and
    a control unit that controls drive of electric mechanisms in accordance with an input drive command, wherein
    the control unit controls the sheet nipping unit to reach a nipping state to nip the sheet in the sheet housing unit upon the sheet detection unit detecting a sheet-present state, and to cancel the nipping state upon detection of absence of the sheet in the sheet housing unit,
    the control unit executes a power saving mode to stop supplying power to at least a part of the electric mechanisms requiring to be supplied with power when driven, other than the sheet detection unit, when no drive command is input for a predetermined time,
    a cancellation condition to cancel the power saving mode upon a detection state of the sheet in the sheet housing unit by the sheet detection unit being changed from absent to present during the power saving mode is set, and
    the control unit controls the sheet nipping unit to cancel the nipping state before execution of the power saving mode.

2. The sheet conveying device according to claim 1, wherein
    the sheet housing unit is a sheet loading unit that houses the sheet by loading the sheet on a loading surface thereof,
    the sheet nipping unit includes a loading unit lift unit that raises and lowers at least a part of the sheet loading unit, and a sheet top nipping member that nips the sheet with the sheet loading unit,
    the loading unit lift unit raises the sheet loading unit to narrow a distance between the sheet loading unit and the sheet top nipping member, and reach the nipping state, and
    the loading unit lift unit lowers the sheet loading unit to widen the distance between the sheet loading unit and the sheet top nipping member, and cancel the nipping state.

3. The sheet conveying device according to claim 1, wherein as a user setting selectable in use, selection is possible between
    a nip cancellation priority setting to control the sheet nipping unit to cancel the nipping state before the control unit executes the power saving mode when no drive command is input for a predetermined time, and
    a power-saving priority setting to execute the power saving mode without the control unit performing control to cancel the nipping state when no drive command is input for a predetermined time.

4. The sheet conveying device according to claim 3, wherein as a further user setting in a state of the power-saving priority setting, selection is possible between
    a sheet removal occasion power-saving cancellation setting to cancel the power saving mode upon the detection state of the sheet in the sheet housing unit by the sheet detection unit being changed from present to absent during the power saving mode, and
    a sheet removal occasion power-saving continuation setting not to cancel the power saving mode regardless of a change in the detection state from present to absent.

5. An image reading device comprising:
    a document conveying unit that conveys a document sheet as a sheet; and
    a conveyed document reading unit that reads a document image of a document sheet conveyed by the document conveying unit, wherein the document conveying unit comprises:

a sheet housing unit that houses a sheet;

a sheet conveying unit that conveys the sheet to a predetermined conveyance destination position;

a sheet detection unit that detects presence or absence of the sheet in the sheet housing unit;

a sheet nipping unit that nips the sheet housed in the sheet housing unit;

a sheet sending unit that applies a conveying force toward the sheet conveying unit to the sheet nipped by the sheet nipping unit and sends out the sheet; and a control unit that controls drive of electric mechanisms in accordance with an input drive command, the control unit controls the sheet nipping unit to reach a nipping state to nip the sheet in the sheet housing unit upon the sheet detection unit detecting a sheet-present state, and to cancel the nipping state upon detection of absence of the sheet in the sheet housing unit, the control unit executes a power saving mode to stop supplying power to at least a part of the electric mechanisms requiring to be supplied with power when driven, other than the sheet detection unit, when no drive command is input for a predetermined time, a cancellation condition to cancel the power saving mode upon a detection state of the sheet in the sheet housing unit by the sheet detection unit being changed from absent to present during the power saving mode is set, and the control unit controls the sheet nipping unit to cancel the nipping state before execution of the power saving mode.

6. The image reading device according to claim 5, further comprising:

a static document reading unit that reads a document image of a document sheet in a static state of being placed by a user at a predetermined fixed position; and an open/close member that exposes the fixed position by being opened and puts the document sheet in a placeable state, wherein upon the open/close member being opened while the sheet conveying device is in the power saving mode, the power saving mode is cancelled.

7. An image forming device comprising:

an image reading unit; and an image forming unit that forms an image based on a document image read by the image reading unit, wherein the image reading unit comprises:

a document conveying unit that conveys a document sheet as a sheet; and a conveyed document reading unit that reads a document image of a document sheet conveyed by the document conveying unit, the sheet conveying device comprises:

a sheet housing unit that houses a sheet;

a sheet conveying unit that conveys the sheet to a predetermined conveyance destination position;

a sheet detection unit that detects presence or absence of the sheet in the sheet housing unit;

a sheet nipping unit that nips the sheet housed in the sheet housing unit;

a sheet sending unit that applies a conveying force toward the sheet conveying unit to the sheet nipped by the sheet nipping unit and sends out the sheet; and a control unit that controls drive of electric mechanisms in accordance with an input drive command, the control unit controls the sheet nipping unit to reach a nipping state to nip the sheet in the sheet housing unit upon the sheet detection unit detecting a sheet-present state, and to cancel the nipping state upon detection of absence of the sheet in the sheet housing unit, the control unit executes a power saving mode to stop supplying power to at least a part of the electric mechanisms requiring to be supplied with power when driven, other than the sheet detection unit, when no drive command is input for a predetermined time, a cancellation condition to cancel the power saving mode upon a detection state of the sheet in the sheet housing unit by the sheet detection unit being changed from absent to present during the power saving mode is set, and the control unit controls the sheet nipping unit to cancel the nipping state before execution of the power saving mode.

\* \* \* \* \*